(12) United States Patent
Jiwani et al.

(10) Patent No.: US 11,243,530 B2
(45) Date of Patent: Feb. 8, 2022

(54) DETECTION AND COMMUNICATION OF SAFETY EVENTS

(71) Applicant: ANI Technologies Private Limited, Karnataka (IN)

(72) Inventors: Moiaz Jiwani, Bilaspur (IN); Azimul Mannan, Bengaluru (IN)

(73) Assignee: ANI Technologies Private Limited, Bengaluru (IN)

( * ) Notice: Subject to any disclaimer, the term of this patent is extended or adjusted under 35 U.S.C. 154(b) by 212 days.

(21) Appl. No.: 16/533,453

(22) Filed: Aug. 6, 2019

(65) Prior Publication Data

US 2020/0166929 A1 May 28, 2020

(30) Foreign Application Priority Data

Nov. 23, 2018 (IN) .............................. 201841044267

(51) Int. Cl.
| | |
|---|---|
| *G05D 1/00* | (2006.01) |
| *B60W 40/09* | (2012.01) |
| *G01C 21/34* | (2006.01) |
| *B64C 39/02* | (2006.01) |
| *G06K 9/00* | (2006.01) |

(52) U.S. Cl.
CPC ............ *G05D 1/0055* (2013.01); *B60W 40/09* (2013.01); *B64C 39/024* (2013.01); *G01C 21/3438* (2013.01); *G05D 1/0022* (2013.01); *G06K 9/00845* (2013.01); *B64C 2201/12* (2013.01)

(58) Field of Classification Search
CPC .... G05D 1/0055; G05D 1/0022; G05D 25/00; B60W 40/08; B60W 40/09; B64C 39/024; B64C 2201/00; B64C 2201/088; B64C 2201/12; B64C 2201/122;
(Continued)

(56) References Cited

U.S. PATENT DOCUMENTS 8,983,682 B1    3/2015  Peeters et al.
9,056,676 B1 *  6/2015  Wang ................. G01C 21/3697
(Continued)

FOREIGN PATENT DOCUMENTS

DE         60124931 T2    1/2007
DE      102014206708 A1  10/2015
(Continued)

*Primary Examiner* — Thomas G Black
*Assistant Examiner* — Brandon Z Willis
(74) *Attorney, Agent, or Firm* — Chip Law Group

(57) ABSTRACT

An Unmanned aerial vehicle (UAV) for detecting and communicating safety-related events to a safety server is provided. A network status of a communication network over which devices associated with the vehicle are communicating with the safety server is identified. The UAV receives metadata including at least location data from the devices when the network status of the communication network indicates low or unavailable connectivity that is hindering communication of the metadata to the safety server by the devices. The UAV processes the metadata and detects safety events associated with the vehicle. The UAV communicates the safety events to the safety server based on at least a safety criterion including detachment of the UAV from the vehicle when the UAV is unable to communicate with the safety server in its attached configuration with the vehicle due to network issues.

20 Claims, 14 Drawing Sheets

(58) Field of Classification Search
CPC ........ B64C 2201/127; B64C 2201/141; B64C 2201/145; G06K 9/00845; G01C 21/34; G01C 21/3438
See application file for complete search history.

(56) References Cited

U.S. PATENT DOCUMENTS

| | | | |
|---|---|---|---|
| 9,555,885 B2* | 1/2017 | Stanek | G05D 1/0276 |
| 9,723,468 B2* | 8/2017 | Cho | G01S 19/17 |
| 10,370,102 B2* | 8/2019 | Boykin | G06F 3/165 |
| 2010/0250022 A1 | 9/2010 | Hines et al. | |
| 2012/0233246 A1* | 9/2012 | Guemez | G06Q 40/00 |
| | | | 709/203 |
| 2018/0007518 A1 | 1/2018 | O'Berry et al. | |
| 2019/0197430 A1* | 6/2019 | Arditi | G01C 21/3438 |
| 2020/0082392 A1* | 3/2020 | Pishevar | G06Q 20/20 |

FOREIGN PATENT DOCUMENTS

| | | | |
|---|---|---|---|
| DE | 102015012311 A1 * | 3/2017 | ........... G08B 25/004 |
| DE | 102015012311 A1 | 3/2017 | |
| KR | 101748030 B1 | 6/2017 | |

\* cited by examiner

DETECTION AND COMMUNICATION OF SAFETY EVENTS

CROSS-RELATED APPLICATIONS

This application claims priority of Indian Application Serial No. 201841044267, filed Nov. 23, 2018, the contents of which are incorporated herein by reference.

FIELD OF THE INVENTION

Various embodiments of the disclosure relate generally to safety systems. More specifically, various embodiments of the disclosure relate to detection and communication of safety events.

BACKGROUND

With the improvement in lifestyles of individuals and limited alternatives of public and private transportation, popularity of on-demand cab services is continuously increasing for travel between source and destination locations. The individuals avail the cab services for commuting to and from their work places, or when the individuals are engaged in personal activities, such as outstation travel. In modern cities, vehicle transit systems play an important role by providing the on-demand cab services to the individuals to travel to their desired destinations. Generally, a vehicle or cab service provider (such as OLA) is engaged in offering the on-demand cab services to passengers. The cab service provider deploys a set of cabs (e.g., cars) in a geographical region to transport the passengers to their desired destinations. Thus, the cab service provider offers a convenient way to the passengers to travel around in the geographical region. However, such cab services have also posed some serious safety concerns on to the passengers as well as drivers.

Generally, as per allocation of vehicles to the passengers by the cab service provider, the drivers of the vehicles transport the passengers from their pick-up locations to respective drop-off locations. However, during such allocation of the vehicles, the passengers and the drivers are oblivious to criminal records of each other. As a result, a growing number of mishaps have been observed during such rides, which are caused by some of the drivers or passengers. Furthermore, during such rides, the passengers and the drivers may encounter accidents, fires, protests, robberies, or the like, which may go unnoticed for a longer time duration or may have delayed response time, and hence result in loss of lives and properties. In recent times, such incidences have grown proportionally that have left some passengers and drivers wondering if they are safe when they are using the cab services. Such safety incidences hamper customers' and drivers' experiences during the rides and damage company's brand image.

In light of the foregoing, there exists a need for a technical and more reliable solution that overcomes the above-mentioned problems and manages detection and communication of safety incidents to a safety center quickly, thereby ensuring quick response time to each real-time safety incident.

SUMMARY

A method and system for detecting and communicating safety events to a safety center by means of an unmanned aerial vehicle (UAV) is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
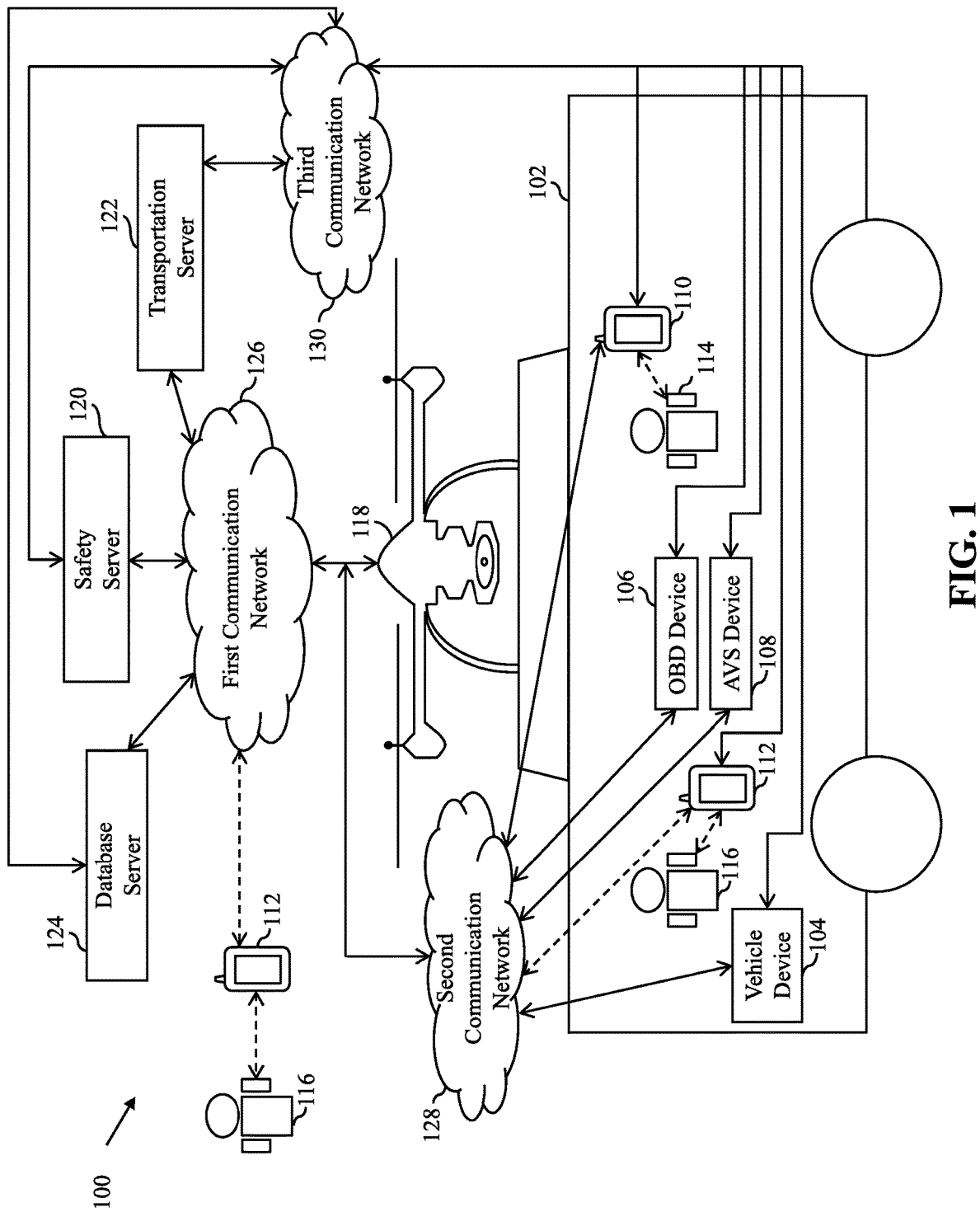
FIG. 1 is a block diagram that illustrates an environment for detection and communication of safety events, in accordance with an exemplary embodiment of the disclosure.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the disclosure. There may be additional components described in the foregoing application that are not depicted on one of the described drawings. In the event such a component is described, but not depicted in a drawing, the absence of such a drawing should not be considered as an omission of such design from the specification.

Before describing the disclosure in detail, it should be observed that the disclosure utilizes a combination of system components, which constitutes methods and systems for detecting and communicating safety events to a safety server during a ride. Accordingly, the components and the method steps have been represented, showing only specific details that are pertinent for an understanding of the disclosure so as not to obscure the disclosure with details that will be readily apparent to those with ordinary skill in the art having the benefit of the description herein. As required, detailed embodiments of the disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the disclosure in virtually any appropriately detailed structure. Further, the terms and phrases used herein are not intended to be limiting but rather to provide an understandable description of the disclosure.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Terms Description (in Addition to Plain and Dictionary Meaning)

Vehicle is a means of transport that is deployed by a transport service provider, such as a cab service provider, to provide on-demand vehicle services to passengers. For example, the vehicle is an automobile, a bus, a car, a bike, or the like. The passengers may travel in the vehicle to commute between source and destination locations.

Passenger is an individual who wants to travel from one location to one or more other locations using a vehicle service offered by a transport service provider. For using the vehicle service, the passenger initiates a booking request for a ride with the transport service provider and provides ride details, such as a source location, a destination location, a vehicle type, a pick-up time, or a combination thereof.

Driver is an individual who drives a vehicle. The driver may register with a transport service provider (e.g., a cab service provider such as OLA) for providing on-demand vehicle services to passengers.

Booking request is a request for a ride, for example, a share-ride, a non-share ride, a rental ride, or the like, initiated by a passenger to travel from one location to one or more other locations. The booking request includes a source location, a destination location, a preferred vehicle type, a pick-up time, or a combination thereof.

Source location is a point of location in a geographical region at which a passenger is currently located. The passenger may initiate a booking request for a ride from the source location. The source location may be interchangeably used as a pick-up location.

Destination location is a point of location in a geographical region where a passenger wants to travel from a source location. The passenger may specify the destination location at the time of initiating a booking request. The terms destination location and drop-off location are interchangeably used hereinafter.

Ride fare is a service fee that is paid by a passenger for a ride using a vehicle service, for example, a cab service that has been offered by a cab service provider to the passenger for the ride between two or more locations. The passenger may pay the ride fare for the ride either in cash or using digital money.

Unmanned aerial vehicle (UAV) is an autonomous or semi-autonomous vehicle that is capable of operating in the air without a physically-present human pilot therein. In an embodiment, the UAV may be attached to a vehicle (e.g., a cab) that can detach itself from the vehicle based on one or more safety conditions or criteria. The UAV may be equipped with one or more sensor units, such as position-tracking sensors, image-capturing sensors, light-emitting diode (LED) sensors, or the like. The position-tracking sensors capture its position information, the image-capturing sensors capture one or more images or videos of its surroundings including the vehicle, and the LED sensors emit different patterns of light based on a degree of a safety event. The UAV may further include a communication module for communicating the safety event to nearby devices and/or remote servers. The UAV can be of various forms, for example, the UAV may take the form of a rotorcraft, such as a helicopter or multi-copter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms such as "drone", "unmanned aerial vehicle system" (UAVS), "unmanned aerial system" (UAS), and the like, that are known in the art may also be used herein to refer to the UAV.

Safety event is an incident in which action or reaction of an object, substance, individual, or the like results into damage or loss of lives and properties, such as a driver, a passenger, or a vehicle. The safety event in a transportation system may correspond to the incident, such as an accident, robbery, protest, fire, scuffle, argument, anomaly, or the like, associated with at least one of the driver, the passenger, or the vehicle. The safety event may further be associated with malfunctioning of devices, such as a driver device, a vehicle device, a passenger device, a UAV, or the like, when they are unable to communicate the requisite information to a safety server over their respective communication channels.

Metadata is data that describes and provides information about other data, such as location data, argument data, anomaly data, vehicle's health data, accident data, malicious intent data, or the like. In an embodiment, the metadata may be processed to detect one or more safety events associated with a driver, a passenger, or a vehicle.

UAV data is data that describes and provides information about other data, such as its location data and surrounding data. The UAV data may be generated by a computing device of a UAV based on real-time images or videos and real-time position information of its surroundings including at least one of a driver, a passenger, or a vehicle.

Safety condition is a condition that triggers attachment or detachment of a UAV from a vehicle based on detection or communication of safety events and their corresponding priorities.

Certain embodiments of the disclosure may be found in a disclosed apparatus, such as an unmanned aerial vehicle (UAV), for detecting safety-related events in a vehicle transit system. The UAV may be attached to a vehicle associated with a driver who is transporting a passenger from a source location to a destination location. The UAV may include circuitry such as a processor, a communication interface, and a memory. The communication interface may communicate with a safety server over a first communication network. The communication interface may further communicate with one or more devices, such as a vehicle device of the vehicle, a driver device of the driver of the vehicle, an on-board diagnostic (OBD) device of the vehicle, or a passenger device of the passenger, over a second communication network. The memory stores one or more instructions that are executed by the processor to identify a network status of a third communication network over which the vehicle device, the driver device, the OBD device, or the passenger device may be communicating with the safety server. In one example, the vehicle device, the driver device, the OBD device, and the passenger device may not be communicating with the safety server when the network status of the third communication network indicates low or unavailable connectivity. In such a scenario, the processor may receive metadata including at least one of location data, audio-video surveillance (AVS) data, or on-board diagnostic (OBD) data from at least one of the vehicle device, the driver device, the OBD device, and the passenger device over the second communication network. The processor may further process the metadata and the UAV data to detect one or more safety events. The UAV data may be generated based on real-time images or videos and real-time position information captured by the UAV. The processor may further communicate the safety events or the metadata along with the UAV data to the safety server based on a safety criterion. The safety criterion may indicate detachment of the UAV from the vehicle when the first communication network is unavailable for communication with the safety server in an attached configuration of the UAV with the vehicle.

Another embodiment of the disclosure provides a vehicle allocation method and system for allocating vehicles to passengers and dynamically updating ride fares for their rides. The vehicle allocation method includes one or more operations that may be executed by circuitry of the vehicle allocation system including at least a transportation server to allocate the vehicles to the passengers and dynamically update the ride fares based on safety services used by the passengers during their rides. In one example, the circuitry may receive a booking request for a ride from a passenger device of a passenger. The booking request includes source and destination locations specified by the passenger. The circuitry may determine a ride fare for the requested ride and communicate the ride fare to the passenger. Based on confirmation of the ride fare by the passenger, the circuitry may allocate a vehicle to the passenger for the ride. The vehicle may be equipped with an unmanned aerial vehicle (UAV) for communicating safety events to a safety server over a first communication network based on a safety criterion. The safety criterion may indicate detachment of the UAV from the vehicle when the first communication network is unavailable for communication with the safety server in an attached configuration of the UAV with the vehicle.

Upon allocation of the vehicle to the passenger for the ride, a driver of the vehicle reaches the source location to pick the passenger. The circuitry may render a user interface on the passenger device when the driver of the vehicle provides an input to start the ride from the source location after the passenger has boarded the vehicle for the ride. The user interface may present a plurality of options, including first and second options, to the passenger. The first option is selectable by the passenger for accepting pairing of the passenger device with the UAV and the second option is selectable by the passenger for declining pairing of the passenger device with the UAV. The circuitry may receive one or more inputs corresponding to at least one of the first and second options during the ride from the passenger device. Based on the one or more inputs provided by the passenger during the ride, the circuitry may dynamically update the ride fare for the ride. The passenger may be prompted to pay the updated ride fare after completion of the ride.

Thus, the method and the system of the present disclosure provide a choice to a transport service provider for proactively identifying safety incidents and capturing incident locations, safety incident logs, and other metadata along with their timestamps. The present disclosure further facilitates communication of the safety incidents to a central command center along with the captured data even if the network coverage is low or unavailable. Based on the timely communication of the safety incidents along with other relevant data, the central command center responds to these safety incidents with minimum turnaround time. Also, the passengers and drivers are allowed to send or receive messages or make calls by means of various safety UAVs. The method and the system of the present disclosure further minimize and prevent unforeseen safety incidents by taking into consideration various parameters from vehicles, driver devices, and passenger devices and initiating the safety processes proactively.

FIG. 1 is a block diagram that illustrates an environment 100 for detection and communication of safety events, in accordance with an exemplary embodiment of the disclosure. The environment 100 includes a vehicle 102 including a vehicle device 104, an on-board diagnostic (OBD) device 106, an audio-video surveillance (AVS) device 108, a driver device 110, and a passenger device 112. The driver device 110 and the passenger device 112 are associated with a driver 114 of the vehicle 102 and a passenger 116, respectively, who may avail the vehicle 102 for a ride. The environment 100 further includes an unmanned aerial vehicle (UAV) 118, a safety server 120, a transportation server 122, and a database server 124. The UAV 118 communicates with the safety server 120, the transportation server 122, and the database server 124 over a first communication network 126. The UAV 118 further communicates with the vehicle device 104, the OBD device 106, the AVS device 108, the driver device 110, and the passenger device 112 over a second communication network 128. The vehicle device 104, the OBD device 106, the AVS device 108, the driver device 110, and/or the passenger device 112 communicate with the safety server 120, the transportation server 122, and the database server 124 over a third communication network 130.

The vehicle 102 is a means of transport that is deployed by a transport service provider, such as a cab service provider, to provide on-demand vehicle services to passengers, such as the passenger 116. Examples of the vehicle 102 include, but are not limited to, an automobile, a bus, a car, and a bike. The vehicle 102 is associated with the driver 114, who drives the vehicle 102 for transporting the passengers from one location point to another location point. The vehicle 102 may be associated with one of various categories of vehicles offered by the transport service provider for the on-demand vehicle services to the passengers. In one example, the vehicle 102 is a micro-category vehicle i.e., a compact hatchback vehicle. In another example, the vehicle 102 is a mini-category vehicle i.e., a regular hatchback vehicle. In yet another example, the vehicle 102 is a prime-category vehicle i.e., a prime sedan vehicle, a prime play vehicle, a prime sport utility vehicle (SUV), or a prime executive vehicle. In yet another example, the vehicle 102 is a lux-category vehicle i.e., a luxury vehicle.

The vehicle device 104 is a computing device that is embedded inside the vehicle 102. Examples of the vehicle device 104 include, but are not limited to, a tablet, a laptop, a vehicle head unit, or any other portable communication device, that is placed in the vehicle 102. The vehicle device 104 may be connected to a vehicle control system, an engine control system, an entertainment control system, or the like. In an embodiment, the vehicle device 104 generates vehicle telemetry and metric data based on global positioning system (GPS) data, vehicle operational data, engine performance data, or the like. The vehicle device 104 further communicates the vehicle telemetry and metric data to the safety server 120, the transportation server 122, or the database server 124. In an embodiment, the vehicle device 104 may be used for remote monitoring and controlling of vehicle operations of the vehicle 102. The vehicle device 104 may further be used by the passengers, such as the passenger 116, for accessing and playing various media content stored in a local memory or the database server 124. The vehicle device 104 may further be used by the driver 114 for navigating from one location point to another location point.

The OBD device 106 is a computing device that is embedded inside the vehicle 102. The OBD device 106 includes different types of sensors that are integrated in vital areas of the vehicle 102 for generating OBD data. The OBD device 106 processes the OBD data, monitors performance of various components of the vehicle 102 according to the designated specifications of the vehicle 102, and generates a performance report for the vehicle 102. For example, the OBD device 106 monitors emission, mileage, speed, and other useful data related to engine or vehicle health. The OBD device 106 further communicates the OBD data and/or the performance report to the safety server 120 or the database server 124. Various communication protocols used by the OBD device 106 include a serial communication protocol (e.g.: RS-232) and a controller area network (CAN). There are at least 5 different standards-based protocol specifications in use for current OBD systems including SAE J1850 PWM/VPW, ISO 9141-2, ISO 14230 KWP2000, and ISO 15765 CAN. Various standards that are known for OBD include OBD-I, OBD 1.5, OBD-II, EOBD (Europe), EOBD2 (Enhanced), and JOBD (Japan) which include various standard interfaces, signal protocols, data communications, or the like. Most of the vehicles, such as the vehicle 102, use the OBD-II interface which uses a standardized female 16-pin J1962 connector.

The AVS device 108 is a computing device that is embedded inside the vehicle 102. The AVS device 108 includes different types of devices (e.g., audio-capturing and image-capturing devices or sensors) that are integrated in vital areas of the vehicle 102 for capturing and generating AVS data. The AVS data includes audio data of verbal communications between the driver 114 and the passengers (such as the passenger 116) captured by the audio-capturing devices (e.g., a microphone). The AVS data further includes image data and/or video data of in-vehicle environment (pertaining to at least one of the driver 114 or the passenger 116) captured by the image-capturing devices (e.g., a camera). The AVS device 108 further processes the AVS data and detects anomalies and/or malicious intents of the driver 114 and/or the passenger 116. The AVS device 108 communicates the AVS data and/or the anomalies and/or the malicious intents to the safety server 120 or the database server 124. The AVS device 108 may also generate different levels of alerts (e.g., sound-based alerts) based on the detected anomalies and/or malicious intents and a degree of severity associated with each detected anomaly and/or malicious intent.

The driver device 110 is a computing device that is used by the driver 114 of the vehicle 102 to perform one or more activities by means of a service application (such as, for example, the OLA Cabs application) installed on the driver device 110. For example, the driver 114 uses the driver device 110 to initiate a log-in process with a service platform facilitated by the transport service provider by means of the service application. Once logged-in, the driver device 110 is automatically connected to the UAV 118, and the connection is automatically disconnected when the driver 114 logs-out of the service application. The driver 114 further uses the driver device 110 to view a new booking request communicated by the transportation server 122. The driver 114 further uses the driver device 110 to accept or reject the new booking request. Upon acceptance of the new booking request, the driver 114 uses the driver device 110 to view passenger information of the allocated passenger (e.g., the passenger 116). The driver 114 may further use the driver device 110 to navigate between various source and destination locations.

Further, the driver device 110 may transmit its real-time position information to the safety server 120 or the transportation server 122. The real-time position information may indicate current position information of the driver device 110, which in turn may be indicative of the current position information of the vehicle 102. The driver device 110 includes one or more position-tracking sensors for tracking the real-time position information of the driver device 110 by way of a navigation system, such as a global positioning system (GPS). Further, the driver device 110 may transmit information, such as an availability status, a current booking status, a ride completion status, a pick-up time, a drop-off time, a ride fare, or the like, to the transportation server 122. In an exemplary embodiment, the driver device 110 may be a vehicle head unit. In another exemplary embodiment, the driver device 110 may be a communication device, such as a smartphone, a tablet, a smart wristband, or any other portable communication, that is placed in the vehicle 102.

The passenger device 112 is a computing device that is used by the passenger 116 to perform one or more activities by means of a service application installed on the passenger device 112. For example, the passenger 116 uses the passenger device 112 to schedule a ride. To schedule the ride, the passenger 116 uses the passenger device 112 to initiate a booking request for the ride by means of the service application. The booking request may include ride-related information, such as a preferred vehicle type, a source location, a destination location, a preferred pick-up time, or other service-related details and preferences specified by the passenger 116. The various modes of input used by the passenger 116 to initiate the booking request may include, but not are limited to, a touch-based input, a text-based input, a voice-based input, a gesture-based input, or a combination thereof. Further, upon confirmation of the booking request for the ride by the passenger 116, the passenger device 112 transmits the booking request to the transportation server 122. In another embodiment, the installed service application transmits the booking request to the transportation server 122.

Further, the passenger 116 uses the passenger device 112 to view various notification interfaces (one at a time) rendered by the transportation server 122. The passenger 116 further provides an input to confirm or reject vehicle allocation initiated by the transportation server 122. The passenger 116 may further use the passenger device 112 to view allocation information including driver information, vehicle information, ride fare information, or the like communicated by the transportation server 122 based on the allocated vehicle, such as the vehicle 102. During the ride, the passenger 116 may provide one or more inputs (hereinafter, "inputs") for accepting or declining pairing of the passenger device 112 with the UAV 118. Examples of the passenger device 112 include, but are not limited to, a personal computer, a laptop, a smartphone, and a tablet computer.

The UAV 118, commonly known as a drone, is an autonomous or semi-autonomous aircraft vehicle that performs one or more defined operations without a human pilot aboard. The various operations of the UAV 118 may be controlled either by a remote control of a pilot on the ground or in another vehicle or autonomously by onboard computers including a specifically designed computer program. Further, the UAV 118 can be designed in various shapes and sizes. The UAV 118 can be of various forms, for example, the UAV 118 may take the form of a rotorcraft such as a helicopter or multi-copter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities.

In an embodiment, the UAV 118 is attached to the vehicle 102, for example, the UAV 118 may be docked on top of the vehicle 102. The UAV 118 may detach itself from the vehicle 102 based on one or more safety conditions or criteria. For example, the UAV 118 detaches from the vehicle 102 based on a degree of each of one or more safety events (hereinafter, "safety events"). The UAV 118 may also detach itself from the vehicle 102 based on commands received from the safety server 120.

In an embodiment, the UAV 118 communicates with the driver device 110 and the passenger device 112 based on a login status of the driver 114 and a preference of the passenger 116 for pairing with the UAV 118, respectively. The UAV 118 further communicates with the safety server 120 over the first communication network 126 by means of one or more channels including at least a voice channel, a data channel, a short messaging service (SMS) channel, or the like. The UAV 118 may also be configured with connectivity details, such as a contact number, a uniform resource locator (URL), or a uniform resource identifier (URI) of the safety center, to make a voice or video call, and communicate the URL, the URI, and/or application programming interface (API) details.

In an embodiment, the UAV 118 includes one or more sensor units, such as one or more position-tracking sensors, image-capturing sensors, light-emitting diode (LED) sensors, or the like. The position-tracking sensors capture real-time position information, the image-capturing sensors capture real-time images and/or videos of its surroundings including at least the vehicle 102, and the LED sensors emit different patterns of light based on the degree of each safety event corresponding to the UAV 118. The safety events are detected based on metadata and UAV data. The UAV 118 generates the UAV data based on the real-time position information and the real-time images and/or videos. The UAV 118 receives the metadata, such as the vehicle telemetry and metric data, the OBD data, the AVS data, or the like, from at least one of the vehicle device 104, the OBD device 106, the AVS device 108, the driver device 110, or the passenger device 112 (if the passenger 116 is inside the vehicle 102 for the ride). The UAV 118 processes the metadata along with the UAV data to detect the safety events.

Further, the UAV 118 communicates the safety events (or the metadata along with the UAV data) to nearby devices (e.g., devices associated with other UAVs or vehicles that are within a defined radial distance) or remote servers (e.g., the safety server 120). For communicating the safety events, the UAV 118 may remain attached to the vehicle 102 or may detach itself from the vehicle 102. The UAV 118 remains attached to the vehicle 102 and communicates the safety events to the nearby devices or the remote servers, when the first communication network 126 is not broken or lost or interrupted (i.e., the connectivity of the UAV 118 with the nearby devices or the remote servers over the first communication network 126 is strong enough for performing desired communication without any interruption). However, when the first communication network 126 is broken or lost or interrupted (i.e., when the first communication network 126 is unavailable for performing communication in an attached configuration of the UAV 118 with the vehicle 102), the UAV 118 detaches itself from the vehicle 102. In one embodiment, upon detachment of the UAV 118 from the vehicle 102, the UAV 118 moves within a communication range of the vehicle 102 and maintains communication with at least one of the vehicle device 104, the OBD device 106, the AVS device 108, the driver device 110, and the passenger device 112 over the second communication network 128. Further, the UAV 118 flies (or moves) within the communication range to detect (or search for) the first communication network 126 so as to establish communication with the safety server 120 for communicating the safety events or the metadata along with the UAV data. In another embodiment, upon detachment of the UAV 118 from the vehicle 102, the UAV 118 moves out of the communication range of the vehicle 102 that disconnects communication with the vehicle device 104, the OBD device 106, the AVS device 108, the driver device 110, and the passenger device 112 over the second communication network 128. Further, the UAV 118 flies (or moves) outside the communication range to detect the first communication network 126 so as to establish communication with the safety server 120 for communicating the safety events or the metadata along with the UAV data.

In scenarios where the UAV 118 fails to establish communication with the safety server 120 over the first communication network 126, the UAV 118 moves within the communication range of the vehicle 102 and maintains communication with at least one of the vehicle device 104, the OBD device 106, the AVS device 108, the driver device 110, and the passenger device 112 over the second communication network 128. Further, the UAV 118 flies within the communication range to detect one or more vehicle devices or UAVs (hereinafter, "vehicle devices or UAVs") associated with other vehicles. Upon detection of the vehicle devices or UAVs, the UAV 118 establishes a chain of communications (i.e., a mesh communication network) by way of the vehicle devices or UAVs for communicating the safety events or the metadata along with the UAV data to the safety server 120. In another embodiment, the UAV 118 moves out of the communication range of the vehicle 102 that disconnects communication with the vehicle device 104, the OBD device 106, the AVS device 108, the driver device 110, and the passenger device 112 over the second communication network 128. Further, the UAV 118 flies outside the communication range to detect the vehicle devices or UAVs associated with other vehicles. Upon detection of the vehicle devices or UAVs, the UAV 118 establishes the chain of communications by way of the vehicle devices or UAVs for communicating the safety events or the metadata along with the UAV data to the safety server 120.

In scenarios where the UAV 118 further fails to establish the chain of communications, the UAV 118 moves out of the communication range of the vehicle 102 that disconnects communication with the vehicle device 104, the OBD device 106, the AVS device 108, the driver device 110, and the passenger device 112 over the second communication network 128. Further, the UAV 118 flies outside the communication range and travels towards a safety hotspot center that is nearest to the vehicle 102 based on location coordinates of the safety hotspot center stored in its memory (shown in FIG. 2). While travelling towards the safety hotspot center, the UAV 118 continues to search for the first communication network 126, or the vehicle devices or UAVs for establishing the chain of communications. If the UAV 118 has not reached the safety hotspot center but has successfully established the first communication network 126 or the chain of communications, then the UAV 118 communicates the safety events or the metadata along with the UAV data to the safety server 120, and thereafter returns and attaches itself to the vehicle 102. However, if the UAV 118 has not yet established the first communication network 126 or the chain of communications, then the UAV 118 reaches the safety hotspot center and communicates the safety events or the metadata along with the UAV data, and thereafter returns and attaches itself to the vehicle 102. Various operations and functionalities of the UAV 118 have been described in detail in conjunction with FIGS. 2, 5A-5B, 6A-6B, 7, 8A-8C, and 9.

The safety server 120 is a computing device, a software framework, or a combination thereof, that may provide a generalized approach to create the safety server implementation. In an embodiment, various operations of the safety server 120 may be dedicated to execution of procedures, such as, but not limited to, programs, routines, or scripts stored in a memory for supporting its applied applications. The safety server 120 may be realized through various web-based technologies, such as, but not limited to, a Java web-framework, a .NET framework, a PHP framework, or any other web-application framework. Examples of the safety server 120 include, but are not limited to, a personal computer, a laptop, or a network of computer systems.

In an embodiment, the safety server 120 receives the metadata from at least one of the vehicle device 104, the OBD device 106, the AVS device 108, the driver device 110, and the passenger device 112. The safety server 120 further receives the UAV data from the UAV 118. The safety server 120 may process the metadata along with the UAV data to detect the safety events and an incident location of each safety event. In another embodiment, the safety server 120 receives the safety events detected by the UAV 118. Further, based on the degree of severity of each safety event, the safety server 120 initiates one or more rescue operations (hereinafter, "rescue operations").

Further, in an embodiment, the safety server 120 dispatches a set of UAVs to track at least one of the vehicle 102, the driver 114, and the passenger 116 based on the incident location. For example, the safety server 120 dispatches only one UAV when the vehicle 102, the driver 114, and the passenger 116 are at the same place and there is no movement of the vehicle 102, the driver 114, and the passenger 116. In another example, the safety server 120 dispatches two or more UAVs when the vehicle 102, the driver 114, and the passenger 116 are scattered i.e., the vehicle 102, the driver 114, and the passenger 116 are moving in different directions. The safety server 120 further communicates the commands or alerts to the UAV 118 for initiating audio and video surveillance of the surrounding environment including at least one of the vehicle 102, the driver 114, and the passenger 116. In another embodiment, the safety server 120 communicates the safety events to nearby safety hotspot centers and commands them to send their rescue teams to the incident location for executing the rescue operations.

The transportation server 122 is a computing device, a software framework, or a combination thereof, that may provide a generalized approach to create the transportation server implementation. In an embodiment, various operations of the transportation server 122 may be dedicated to execution of procedures, such as, but not limited to, programs, routines, or scripts stored in a memory for supporting its applied applications. The transportation server 122 may be realized through various web-based technologies, such as, but not limited to, a Java web-framework, a .NET framework, a PHP framework, or any other web-application framework. Examples of the transportation server 122 include, but are not limited to, a personal computer, a laptop, or a network of computer systems.

In an embodiment, the transportation server 122 receives the booking request for the ride from the passenger device 112. The transportation server 122 processes the booking request to determine the ride-related information, such as the preferred vehicle type, the source location, the destination location, the preferred pick-up time, or other service-related details and preferences specified by the passenger 116. Further, the transportation server 122 determines a ride fare for the ride based on at least the ride-related information, real-time traffic conditions between the source and destination locations, a ride time for transporting the passenger 116 from the source location to the destination location, a ride distance between the source and destination locations, or a combination thereof. The transportation server 122 further renders a fare notification interface on the passenger device 112 over the third communication network 130. The fare notification interface presents at least the determined ride fare along with an estimated time of pick-up from the source location. Upon receiving confirmation of the ride from the passenger device 112 provided by the passenger 116, the transportation server 122 allocates an available vehicle, such as the vehicle 102, to the passenger 116 for the ride. Further, the transportation server 122 renders an allocation notification interface on the driver device 110 or the passenger device 112. The allocation notification interface presents at least the allocation information (such as the passenger information, the driver information, the vehicle information, or the like) to the driver 114 and the passenger 116.

Further, the transportation server 122 renders a safety notification interface on the passenger device 112 for facilitating a drone-based safety service to the passenger 116, when the passenger 116 has boarded the vehicle 102 for the ride and the driver 114 has provided an input to start the ride from the source location. The safety notification interface presents a plurality of options, including first and second options, along with various terms and conditions for availing the drone-based safety service. The options may be presented based on a ride distance, a ride type, a time of a day, a vehicle type, or a route type associated with the ride requested by the passenger 116. In one example, the passenger 116 may accept the terms and conditions of the usage and select the first option to accept pairing of the passenger device 112 with the UAV 118. Further, at any point of time during the ride, the passenger 116 may select the second option to stop the existing pairing of the passenger device 112 with the UAV 118. In another example, the passenger 116 may select the second option to decline pairing of the passenger device 112 with the UAV 118. In an embodiment, the passenger 116 can select (or deselect) the first and second options any number of times during the ride as per convenience or preference.

The transportation server 122 receives the inputs, corresponding to selection of at least one of the first and second options during the ride, from the passenger device 112 when the passenger 116 wants to avail the drone-based safety service during the ride. Based on the inputs provided by the passenger 116 during the ride, the transportation server 122 dynamically updates the ride fare. The transportation server 122 may render an updated fare notification interface on the passenger device 112 that presents the updated ride fare to the passenger 116. The passenger 116 is prompted to pay the updated ride fare after completion of the ride.

The database server 124 is a data management and storage server that includes a processor (not shown) and a memory (not shown) for managing and storing historical travel data of passengers, such as the passenger 116. The historical travel data includes travel data of rides (e.g., share-rides, non-share rides, inter-city rides, fixed rental rides, or the like) taken by the passengers in the past using various vehicles, such as the vehicle 102, offered by the transport service provider. In an exemplary embodiment, the historical travel data of each passenger, such as the passenger 116, may include historical pick-up and drop-off locations, a frequency of historical rides between each historical pick-up and drop-off locations, or a time range of each historical ride that had been taken by the passenger 116 in the past. The processor of the database server 124 may determine the time range of each historical ride based on a pick-up time or a ride booking time of each historical ride, and a drop-off time of each historical ride.

The historical travel data may further include a usage frequency of using the drone-based safety service by each passenger during historical rides with the vehicles (such as the vehicle 102) that are equipped with UAVs (such as the UAV 118). Such usage frequency may be used by the transportation server 122 for performing allocation of the vehicles to the passengers. For example, if the usage frequency of the passenger 116 is less than a threshold value, then the transportation server 122 may not allocate an available vehicle, such as the vehicle 102 that is equipped with the UAV 118, to the passenger 116 and will allocate an available vehicle that is not equipped with any UAV. However, if the usage frequency of the passenger 116 is greater than or equal to the threshold value, then the transportation server 122 may allocate the vehicle 102 to the passenger 116 for the ride.

The historical travel data may further include historical preferences of the passenger 116 for various vehicle types, such as the micro-category vehicle, the mini-category vehicle, the prime-category vehicle, or the like. The processor of the database server 124 receives the historical travel data of the passengers (such as the passenger 116) from driver or passenger devices (such as the driver device 110 or the passenger device 112) and stores it in the memory of the database server 124.

Further, the database server 124 manages and stores the passenger information of the passengers and the driver information of the drivers. For example, the passenger information of each passenger may include at least a passenger name, a passenger contact number, or a passenger account of each passenger registered with the transport service provider. Similarly, the driver information of each driver may include at least a driver name, a registered vehicle make, a vehicle type, or a driver account of each driver registered with the transport service provider. In an embodiment, the processor of the database server 124 may generate a tabular data structure including one or more rows and columns for storing the information of the passengers (or the drivers) in a structured manner in the memory. For example, each row may be associated with a unique passenger identifier (ID) of each passenger, and one or more columns corresponding to each row may indicate the passenger name, the passenger ID, the historical pick-up and drop-off locations, the frequency of each historical ride, the time range of each historical ride, the usage frequency, or the historical preferences for various vehicle types.

Further, the database server 124 manages and stores the metadata, such as the vehicle telemetry and metric data, the OBD data, the AVS data, or the like. In one example, the database server 124 may receive the metadata from at least one of the vehicle device 104, the OBD device 106, the AVS device 108, the driver device 110, or the passenger device 112. In another example, the database server 124 may receive the metadata from at least one of the safety server 120 or the transportation server 122. The database server 124 further manages and stores the UAV data. The database server 124 further manages and stores a list of safety incidents and a priority associated with each safety incident. The database server 124 further manages and stores location coordinates of various safety hotspot centers associated with each geographical region.

In an embodiment, the database server 124 may receive a query from the transportation server 122 to extract information stored in the memory of the database server 124. In response to the received query, the database server 124 retrieves and communicates the requested information to the transportation server 122. Examples of the database server 124 include, but are not limited to, a personal computer, a laptop, or a network of computer systems.

A communication network, such as the first communication network 126, the second communication network 128, or the third communication network 130, is a medium through which content and messages are transmitted between various entities, such as the vehicle device 104, the OBD device 106, the AVS device 108, the driver device 110, the passenger device 112, the UAV 118, the safety server 120, the transportation server 122, and the database server 124. Examples of the communication network include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, or any combinations thereof. Various entities in the environment 100 may connect to at least one of the first communication network 126, the second communication network 128, or the third communication network 130 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof.

Figure 2:
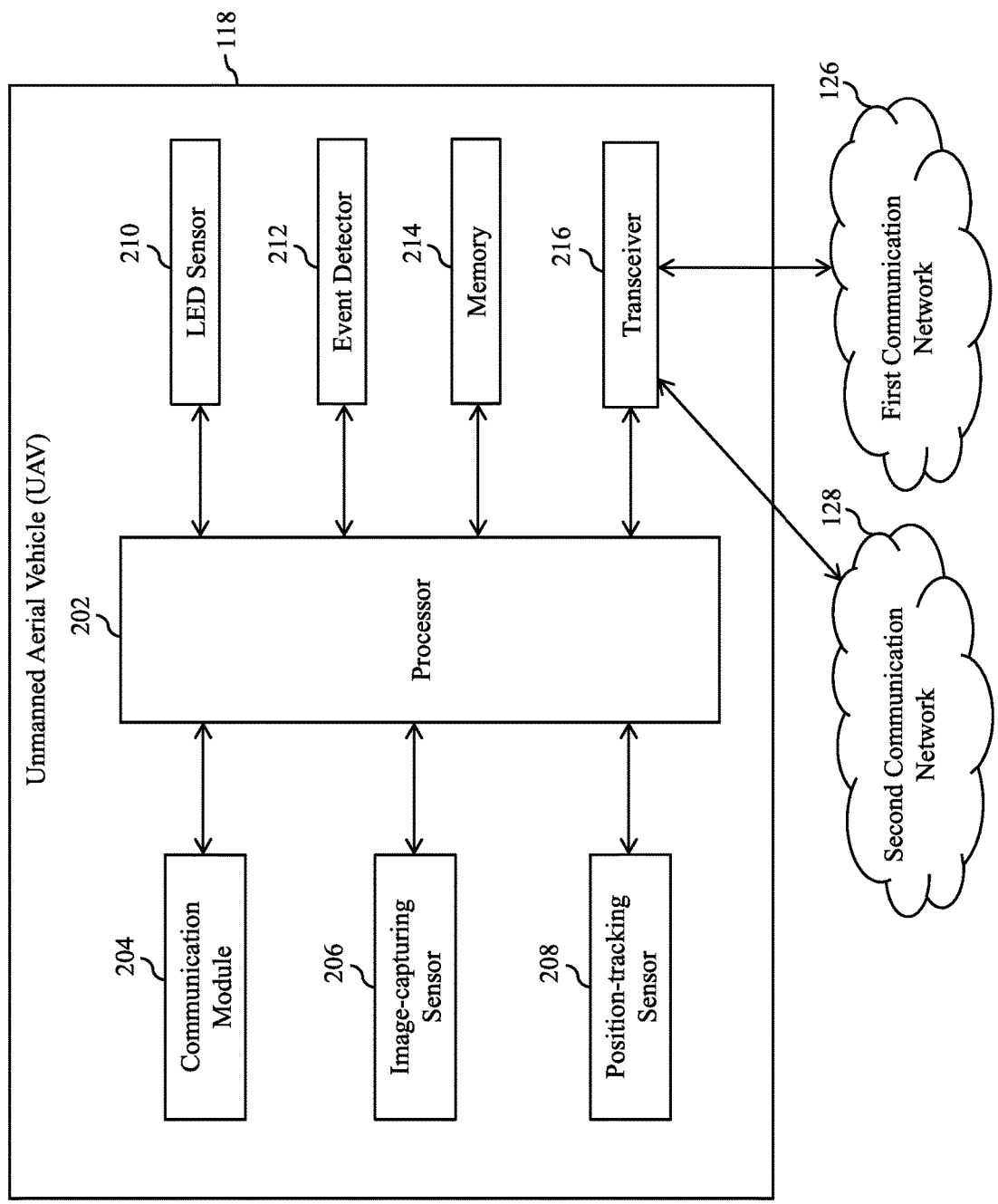
FIG. 2 is a block diagram that illustrates an unmanned aerial vehicle (UAV) of the environment of FIG. 1, in accordance with an exemplary embodiment of the disclosure.

FIG. 2 is a block diagram that illustrates the UAV 118, in accordance with an exemplary embodiment of the disclosure. The UAV 118 includes circuitry such as a processor 202, a communication module 204, an image-capturing sensor 206, a position-tracking sensor 208, an LED sensor 210, an event detector 212, a memory 214, and a transceiver 216 that communicate with each other by way of a communication bus (not shown).

The processor 202 includes suitable logic, circuitry, and/or interfaces that are operable to execute one or more instructions stored in the memory 214 to perform one or more operations. For example, the processor 202 controls and manages attachment or detachment of the UAV 118 with the vehicle 102 based on the safety events associated with at least one of the vehicle 102, the driver 114, or the passenger 116. The processor 202 further controls and manages attachment or detachment of the UAV 118 with the vehicle 102 based on a network status of the first, second, or third communication network 126, 128, or 130. The network status may indicate availability or unavailability of the first, second, or third communication network 126, 128, or 130 for the respective communication. In an exemplary embodiment, the network status may be determined based on signal strength of each communication network 126, 128, or 130.

Further, the processor 202 controls and manages in-air movement of the UAV 118 within or outside the communication range of the vehicle 102 based on flight characteristic information (e.g., in-air paths for in-air movements including altitude, longitude, or latitude information) stored in the memory 214. The processor 202 further controls and manages detection of various communication networks, such as the first, second, and third communication network 126, 128, and 130, and establishes the requisite communication with various devices or servers, when communications with various devices or servers are lost, interrupted, or broken. The processor 202 further controls and manages communication flow and message routing across various devices or servers. Examples of the processor 202 include, but are not limited to, an application-specific integrated circuit (ASIC) processor, a reduced instruction set computing (RISC) processor, a complex instruction set computing (CISC) processor, and a field-programmable gate array (FPGA). It will be apparent to a person skilled in the art that the processor 202 is compatible with multiple operating systems.

The communication module 204 includes suitable logic, circuitry, and/or interfaces that are operable to execute one or more instructions stored in the memory 214 to perform one or more operations. For example, the communication module 204 facilitates one or more communication channels, such as the voice channel, the data channel, or the SMS channel, for communicating with the driver device 110, the passenger device 112, or the safety server 120 by way of the first or second communication network 126 or 128. The communication module 204 may be configured to make voice calls, video calls, or SMSs to a configured contact number associated with the safety center (e.g., an OLA safety center). The communication module 204 may also connect with the safety server 120 by making the API call over a data network, such as the first communication network 126. The API call represents a set of specific operations that may be invoked at runtime to perform specific tasks, such as, but not limited to, querying, adding, updating, or deleting data in the safety server 120.

The communication module 204 may also establish a mesh communication network (i.e., the chain of communications) with other vehicles (e.g., OLA vehicles and/or partnered vehicles) and/or other drones (e.g., OLA safety drones and/or partnered drones) for communicating messages corresponding to the safety events or the metadata along with the UAV data to the safety center. Upon establishment of the mesh communication network, the communication module 204 may communicate the messages corresponding to the safety events and/or the metadata along with the UAV data to other vehicles and/or drones.

Further, the communication module 204 may receive the commands from the safety server 120 over the first communication network 126 by way of the transceiver 216. In another embodiment, the communication module 204 may receive the commands from the safety server 120 by means of other vehicles and/or drones. Based on the received commands, the communication module 204 communicates one or more sets of instructions to one or more sensors units, such as the image-capturing sensor, for performing one or more dedicated operations such as audio and video surveillance of the surrounding including the vehicle 102, the driver 114, and/or the passenger 116. In a scenario where the network (e.g., the first communication network 126) is not available for communication due to poor or broken connectivity, the communication module 204 stores the metadata along with the UAV data in the memory 214 and communicates them to the safety server 120 when the network is available for communication with the safety server 120.

The image-capturing sensor 206 is a sensor (or a group of sensors) that captures the images and/or videos of its surrounding including at least the vehicle 102, the driver 114, and/or the passenger 116. The image-capturing sensor 206 further detects and conveys information, in form of signals, that constitutes the images and/or videos and stores it in the memory 214. Examples of the image-capturing sensor 206 include, but are not limited to, a charge-coupled device (CCD) sensor, a complementary metal-oxide-semiconductor (CMOS) sensor, and a back-side-illuminated CMOS (BSI-CMOS) sensor.

The position-tracking sensor 208 is a sensor (or a group of sensors) that measures the position information of the UAV 118 on the earth in real-time and stores it in the memory 214. The real-time position information is captured by way of a navigation system, such as a global positioning system (GPS). The position-tracking sensor 208 may be an absolute position sensor or a relative position sensor (i.e., displacement sensors). The position-tracking sensor 208 may be designed to measure linear positions, angular positions, multi-axis positions, or a combination thereof.

The LED sensor 210 is a sensor (or a group of sensors) that emits different patterns or colors of light. In an embodiment, the LED sensor 210 may operate to emit different patterns or colors of light based on the safety events. In an embodiment, each pattern or color of light may indicate a safety status, index, or level associated with the vehicle 102, the driver 114, the passenger 116, and/or the UAV 118. The pattern or color of light may change from one pattern or color to another pattern or color when there is a change in the safety level associated with the vehicle 102, the driver 114, the passenger 116, and/or the UAV 118. The different patterns or colors of light may be visible from a remote place. Thus, in case of the rescue operations, the rescue team or the safety UAVs may follow the different patterns or colors of light to navigate and reach the incident location.

The event detector 212 includes suitable logic, circuitry, and/or interfaces that are operable to execute one or more instructions stored in the memory 214 to perform one or more operations. For example, the event detector 212 retrieves the metadata and/or the UAV data from the memory 214. The metadata includes the vehicle telemetry and metric data (e.g., GPS data, vehicle operational data, engine performance data, or the like), the OBD data (e.g., emission data, mileage data, speed data, or the like), the AVS data (e.g., in-vehicle audio, image, or video data), or the like. The UAV data includes the real-time position information and the real-time images and/or videos of the surrounding including at least the vehicle 102.

Further, in an embodiment, the event detector 212 processes and analyzes the metadata and/or the UAV data to detect the incident location and the safety events associated with the incident location. The event detector 212 further assigns the priority (i.e., the degree of severity) to each safety event, such as a high priority event, a medium priority event, or a low priority event. The priority of each safety event may be identified based on a list of defined event-priority data set including various types of safety events and their priority. The event detector 212 may be realized by use of one or more mathematical models, statistical models, and/or algorithms, such as natural-processing techniques and algorithms, image-processing techniques and algorithms, or the like. The event detector 212 may be implemented by means of one or more processors, such as, but not limited to, an ASIC processor, a RISC processor, a CISC processor, and an FPGA.

The memory 214 includes suitable logic, circuitry, and/or interfaces to store the one or more instructions that are executed by the processor 202, the communication module 204, the image-capturing sensor 206, the position-tracking sensor 208, the LED sensor 210, the event detector 212, and the transceiver 216 to perform their operations. The memory 214 further stores the flight characteristic information (e.g., in-air paths for in-air movements including altitude, longitude, or latitude information). The memory 214 further stores the metadata along with the UAV data. The memory 214 may further store the list of defined event-priority data set and the detected safety events along with their priorities. The memory 214 may further store the location coordinates of the safety hotspot centers that are associated with the current ride. Examples of the memory 214 include, but are not limited to, a random-access memory (RAM), a read-only memory (ROM), a programmable ROM (PROM), and an erasable PROM (EPROM).

The transceiver 216 includes suitable logic, circuitry, and/or interfaces that transmits and receives data over various communication networks (such as the first or second communication network 126 or 128) using one or more communication network protocols under the control of the processor 202. The transceiver 216 transmits/receives various requests and messages to/from the vehicle device 104, the OBD device 106, the AVS device 108, the driver device 110, the passenger device 112, the safety server 120, the transportation server 122, the database server 124, or the like. Examples of the transceiver 216 include, but are not limited to, an antenna, a radio frequency transceiver, a wireless transceiver, a Bluetooth transceiver, an ethernet port, a universal serial bus (USB) port, or any other device configured to transmit and receive data. The transceiver 216 communicates with the vehicle device 104, the OBD device 106, the AVS device 108, the driver device 110, the passenger device 112, the safety server 120, the transportation server 122, or the database server 124 using various wired and wireless communication protocols, such as TCP/IP, UDP, 2G, 3G, 4G, or 5G communication protocols, or any combination thereof.

Figure 3:
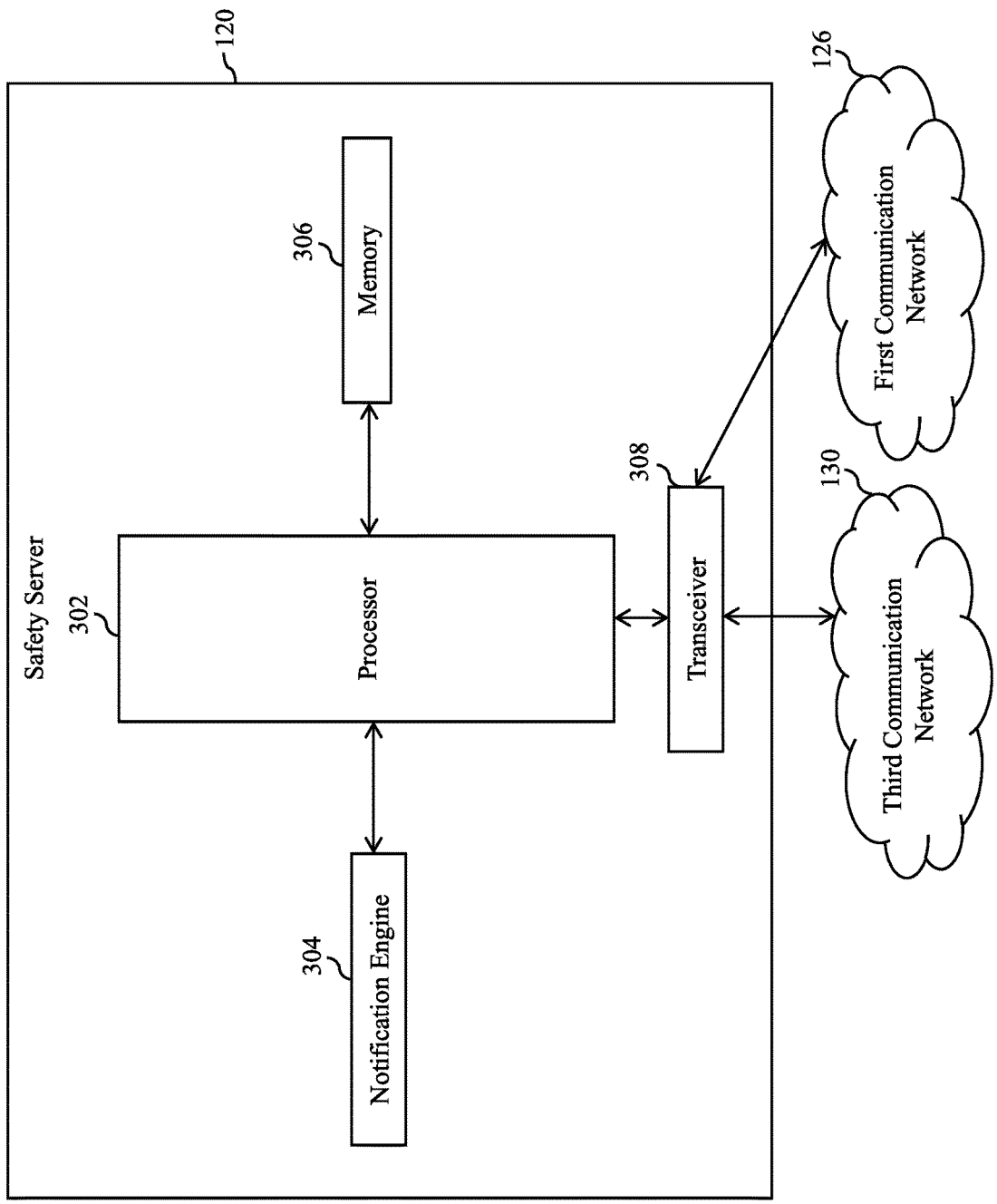
FIG. 3 is a block diagram that illustrates a safety server of the environment of FIG. 1, in accordance with an exemplary embodiment of the disclosure.

FIG. 3 is a block diagram that illustrates the safety server 120, in accordance with an exemplary embodiment of the disclosure. The safety server 120 includes circuitry such as a processor 302, a notification engine 304, a memory 306, and a transceiver 308 that communicate with each other by way of a communication bus (not shown).

The processor 302 includes suitable logic, circuitry, and/or interfaces that are operable to execute one or more instructions stored in the memory 306 to perform one or more operations. For example, the processor 302 receives the metadata and/or the UAV data from various devices associated with the vehicle 102 and/or the UAV 118, respectively, and stores it in the memory 306. The processor 302 processes the metadata and/or the UAV data to detect the incident location and the safety events associated with the incident location. In another embodiment, the processor 302 receives the incident location and the safety events associated with the incident location from the UAV 118, and thereafter validates them based on the metadata and/or the UAV data. The processor 302 may further dispatch the set of UAVs to track the vehicle 102, the driver 114, and/or the passenger 116 based on the priority associated with each safety event and the incident location of each safety event. The set of UAVs is dispatched to keep a close track (e.g., visual track) of the vehicle 102, the driver 114, and/or the passenger 116. The processor 302 further controls and manages communication flow and message routing across various devices or servers. Examples of the processor 302 include, but are not limited to, an ASIC processor, a RISC processor, a CISC processor, and an FPGA. It will be apparent to a person skilled in the art that the processor 302 is compatible with multiple operating systems.

The notification engine 304 includes suitable logic, circuitry, and/or interfaces that are operable to execute one or more instructions stored in the memory 306 to perform one or more operations. For example, the notification engine 304 communicates notifications (e.g., rescue-related commands or alerts) to various rescue teams for initiating the rescue operations, based on the degree of severity of each safety event. The rescue teams may include one or more individuals from various private and/or public entities, such as a police officer, a traffic officer, a medical practitioner, a private safety officer (e.g., an OLA safety officer), or the like. The notification engine 304 further communicates notifications (e.g., surveillance-related commands or alerts) to the UAV 118 for performing the audio and video surveillance of the incident location along with the surrounding area including at least one of the vehicle 102, the driver 114, and/or the passenger 116. The notification engine 304 may be implemented by means of one or more processors, such as, but not limited to, an ASIC processor, a RISC processor, a CISC processor, and an FPGA.

The memory 306 includes suitable logic, circuitry, and/or interfaces to store the one or more instructions that are executed by the processor 302, the notification engine 304, and the transceiver 308 to perform their operations. The memory 306 further stores the metadata along with the UAV data. The memory 306 may further store the list of defined event-priority data set and the detected safety events along with their priorities. The memory 306 may further store the location coordinates of the various safety hotspot centers.

The memory 306 may further store contact information (e.g., contact numbers, email identifiers (IDs), or the like) of various entities (such as police stations, hospitals, fire stations, safety hotspot centers, or the like) and/or various individuals associated with such entities. Examples of the memory 306 include, but are not limited to, a RAM, a ROM, a PROM, and an EPROM.

The transceiver 308 includes suitable logic, circuitry, and/or interfaces that transmits and receives data over various communication networks (such as the first, second, or third communication network 126, 128, or 130) using one or more communication network protocols under the control of the processor 302. The transceiver 308 transmits/receives various requests and messages to/from the vehicle device 104, the OBD device 106, the AVS device 108, the driver device 110, the passenger device 112, the UAV 118, the transportation server 122, the database server 124, or the like. Examples of the transceiver 308 include, but are not limited to, an antenna, a radio frequency transceiver, a wireless transceiver, a Bluetooth transceiver, an ethernet port, a USB port, or any other device configured to transmit and receive data. The transceiver 308 communicates with the vehicle device 104, the OBD device 106, the AVS device 108, the driver device 110, the passenger device 112, the UAV 118, the transportation server 122, or the database server 124 using various wired and wireless communication protocols, such as TCP/IP, UDP, 2G, 3G, 4G, or 5G communication protocols, or any combination thereof.

Figure 4:
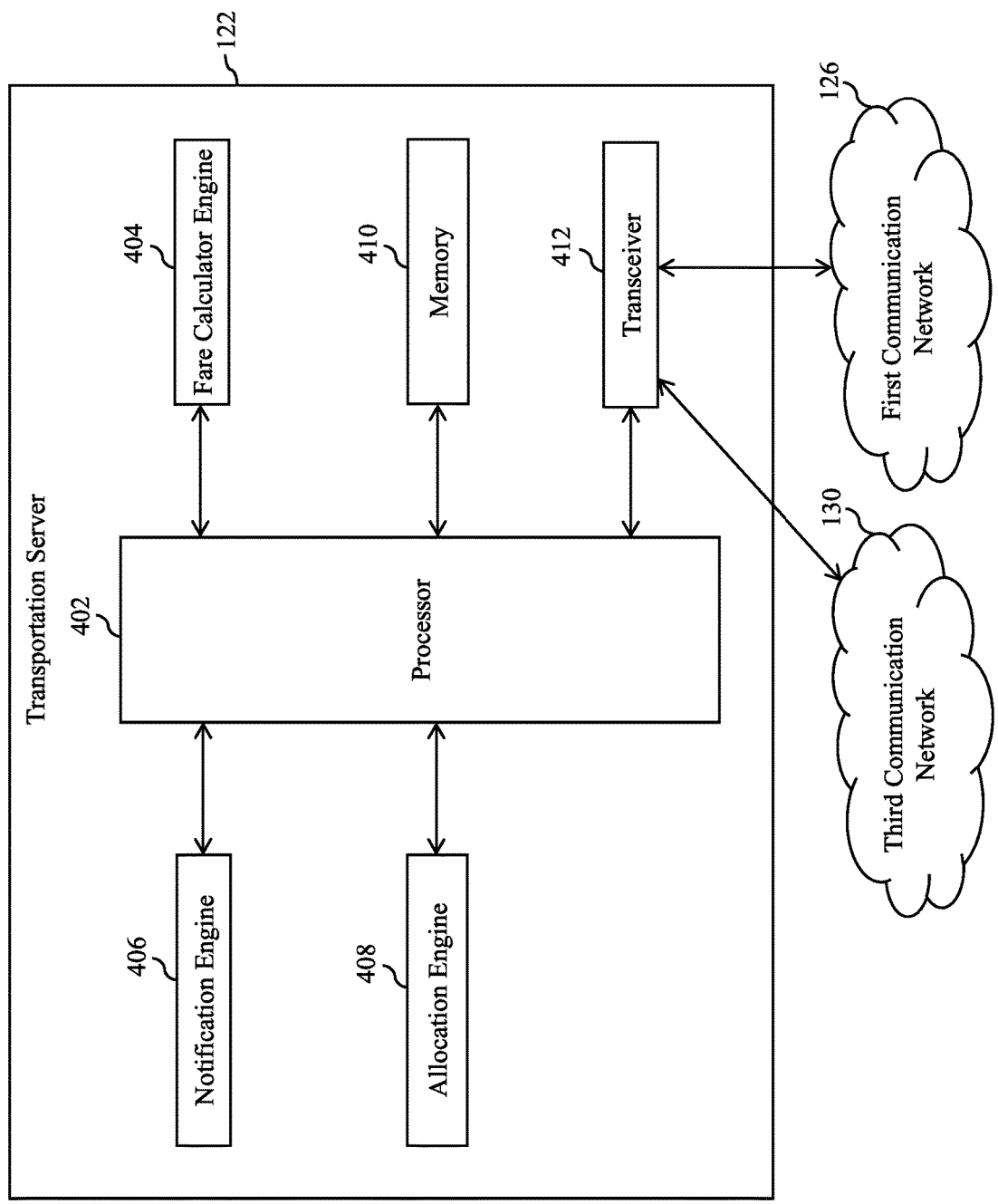
FIG. 4 is a block diagram that illustrates a transportation server of the environment of FIG. 1, in accordance with an exemplary embodiment of the disclosure.

FIG. 4 is a block diagram that illustrates the transportation server 122, in accordance with an exemplary embodiment of the disclosure. The transportation server 122 includes circuitry such as a processor 402, a fare calculator engine 404, a notification engine 406, an allocation engine 408, a memory 410, and a transceiver 412 that communicate with each other by way of a communication bus (not shown).

The processor 402 includes suitable logic, circuitry, and/or interfaces that are operable to execute one or more instructions stored in the memory 410 to perform one or more operations. For example, the processor 402 processes the booking request received from the passenger device 112 and determines the ride-related information, such as the preferred vehicle type, the source location, the destination location, the preferred pick-up time, or other service-related details and preferences specified by the passenger 116 for the requested ride. The processor 402 further transmits the allocation information to the driver device 110 and the passenger device 112 based on allocation of the vehicle 102 to the passenger 116. The processor 402 may further communicate instructions and control commands to other circuitry of the transportation server 1122, such as the fare calculator engine 404, the notification engine 406, the allocation engine 408, the memory 410, and the transceiver 412, for performing their corresponding operations, as described below. Examples of the processor 402 include, but are not limited to, an ASIC processor, a RISC processor, a CISC processor, and an FPGA. It will be apparent to a person skilled in the art that the processor 402 is compatible with multiple operating systems.

The fare calculator engine 404 includes suitable logic, circuitry, and/or interfaces that are operable to execute one or more instructions stored in the memory 410 to perform one or more operations. For example, the fare calculator engine 404 calculates the ride fare for the ride requested by the passenger 116. The ride fare may be calculated based on at least the ride distance, the ride time, the real-time traffic conditions, current demand and supply for vehicle services, or a combination thereof. In an embodiment, the fare calculator engine 404 may further update the ride fare based on at least a total time duration (for which the passenger 116 has availed the drone-based safety service during the ride) and a ride cost per unit of time. The total time duration may be determined based on the inputs provided by the passenger 116 corresponding to the first and/or second options during the ride. The fare calculator engine 404 further stores ride fare information (e.g., the ride fare and/or the updated ride fare) in the memory 410. The fare calculator engine 404 may be realized by use of one or more mathematical models, statistical models, algorithms, or a combination thereof. Further, the fare calculator engine 404 may be implemented using an ASIC processor, a RISC processor, a CISC processor, an FPGA, or a combination thereof.

The notification engine 406 includes suitable logic, circuitry, and/or interfaces that are operable to execute one or more instructions stored in the memory 410 to perform one or more operations. For example, the notification engine 406 retrieves the ride fare information from the memory 410 and renders the fare notification interface including the ride fare information on the passenger device 112. The fare notification interface presents at least the determined ride fare along with the estimated pick-up time. The notification engine 406 further retrieves the allocation information from the memory 410 and renders the allocation notification interface on the driver device 110 or the passenger device 112. The allocation notification interface presents at least the allocation information such as the passenger information, the driver information, the vehicle information, or a combination thereof. The notification engine 406 further renders the safety notification interface on the passenger device 112 when the ride has started (i.e., when the passenger 116 has boarded the vehicle 102 and the driver 114 has provided the input to start the ride from the source location). The safety notification interface presents the options, including the first and second options, along with various terms and conditions for availing the drone-based safety service. In case the passenger 116 provides inputs to avail the drone-based safety service during the ride, the notification engine 406 may further render the updated fare notification interface on the passenger device 112. The updated fare notification interface presents the updated ride fare to the passenger 116. The notification engine 406 may be realized by use of one or more mathematical models, statistical models, algorithms, or a combination thereof. Further, the notification engine 406 may be implemented using an ASIC processor, a RISC processor, a CISC processor, an FPGA, or a combination thereof.

The allocation engine 408 includes suitable logic, circuitry, and/or interfaces that are operable to execute one or more instructions stored in the memory 410 to perform one or more operations. For example, the allocation engine 408 allocates an available vehicle, such as the vehicle 102, to the passenger 116 for the ride. The vehicle 102 may be allocated to the passenger 116 based on confirmation of the ride fare for the ride submitted by the passenger 116. The vehicle 102 may further be allocated to the passenger 116 based on confirmation of the booking request by the driver 114 of the vehicle 102. The allocation engine 408 may be realized by use of one or more mathematical models, statistical models, algorithms, or a combination thereof. Further, the allocation engine 408 may be implemented using an ASIC processor, a RISC processor, a CISC processor, an FPGA, or a combination thereof.

The memory 410 includes suitable logic, circuitry, and/or interfaces to store the one or more instructions that are executed by the processor 402, the fare calculator engine 404, the notification engine 406, the allocation engine 408, and the transceiver 412 to perform their operations. The memory 410 further stores the booking request received from the passenger device 112. The memory 410 may further store the ride fare information, the allocation information, the vehicle information, the driver information, the passenger information, or the like. Examples of the memory 410 include, but are not limited to, a RAM, a ROM, a PROM, and an EPROM.

The transceiver 412 includes suitable logic, circuitry, and/or interfaces that transmits and receives data over various communication networks (such as the first or third communication network 126 or 130) using one or more communication network protocols under the control of the processor 402. The transceiver 412 transmits/receives various requests and messages to/from the vehicle device 104, the OBD device 106, the AVS device 108, the driver device 110, the passenger device 112, the UAV 118, the transportation server 122, the database server 124, or the like. Examples of the transceiver 412 include, but are not limited to, an antenna, a radio frequency transceiver, a wireless transceiver, a Bluetooth transceiver, an ethernet port, a USB port, or any other device configured to transmit and receive data. The transceiver 412 communicates with the vehicle device 104, the OBD device 106, the AVS device 108, the driver device 110, the passenger device 112, the UAV 118, the transportation server 122, or the database server 124 using various wired and wireless communication protocols, such as TCP/IP, UDP, 2G, 3G, 4G, or 5G communication protocols, or any combination thereof.

Figure 5A:
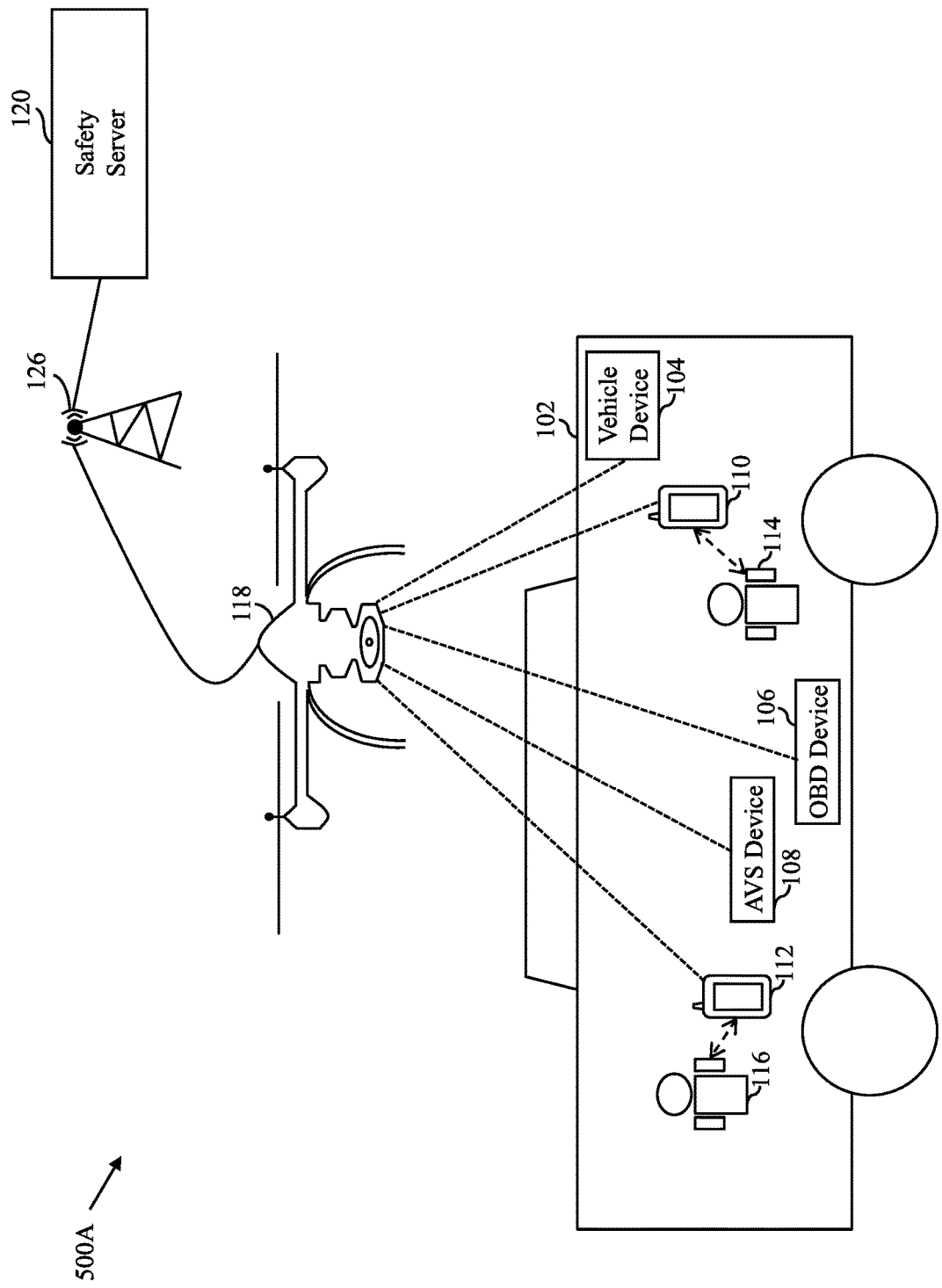
FIG. 5A is a block diagram that illustrates an exemplary environment for communicating safety events to the safety server over a first communication network of FIG. 1, in accordance with an exemplary embodiment of the disclosure.

FIG. 5A is a block diagram that illustrates an exemplary environment 500A for communicating the safety events (and/or the metadata along with the UAV data) to the safety server 120 over the first communication network 126, in accordance with an exemplary embodiment of the disclosure.

With reference to the exemplary environment 500A, it is assumed that the driver 114 is driving the vehicle 102 having the UAV 118 attached to it, for example, at the roof top of the vehicle 102. The vehicle 102 may or may not include any passenger. However, without limiting the scope of the disclosure, it is further assumed that the passenger 116 is inside the vehicle 102 and the driver 114 is driving the vehicle 102 for transporting the passenger 116 to the destination location. Thus, the exemplary environment 500A shows the vehicle 102 including the vehicle device 104, the OBD device 106, the AVS device 108, the driver device 110 (associated with the driver 114), and the passenger device 112 (associated with the passenger 116), the UAV 118, and the safety server 120. Further, the vehicle device 104, the OBD device 106, the AVS device 108, the driver device 110, and the passenger device 112 are communicatively connected with the UAV 118 over the second communication network 128 (shown by dotted lines in FIG. 5A). Further, the vehicle device 104, the OBD device 106, the AVS device 108, the driver device 110, and the passenger device 112 currently are not communicating with the safety server 120 due to unavailability of the third communication network 130. For example, when the strength of communication signal (associated with the third communication network 130) is weak or when the third communication network 130 is broken or lost or interrupted, the third communication network 130 may not be available for communication. Thus, when the third communication network 130 is not available for communication, the UAV 118 may transmit a query to at least one of the vehicle device 104, the OBD device 106, the AVS device 108, the driver device 110, and the passenger device 112 over the second communication network 128 and request for the metadata (such as the vehicle telemetry and metric data, the OBD data, the AVS data, the location data, or the like). The UAV 118 receives the metadata from at least one of the vehicle device 104, the OBD device 106, the AVS device 108, the driver device 110, and the passenger device 112 over the second communication network 128 and stores it in its memory 214.

Further, the UAV 118 may process the metadata along with the UAV data to check if any safety-related incident has occurred or not. In an event of occurrence of a safety event, the UAV 118 identifies a priority of the safety event based on the list of defined event-priority data set and generates an alert level (e.g., "high alert", "medium alert", "low alert", or "no alert") for the safety event based on the identified priority. For example, the priority of the safety event is identified as "no alert". In such a scenario, the UAV 118 may perform a check to determine whether the first communication network 126 is available or unavailable for communication with the safety server 120. In a scenario where the first communication network 126 is available for communication with the safety server 120, the UAV 118 (that is attached to the vehicle 102) communicates the safety event and/or the metadata along with the UAV data to the safety server 120 over the first communication network 126 irrespective of the priority of the safety event. However, when the first communication network 126 is not available for communication for a configurable period of time due to weak signal strength or any other technical or non-technical interruption, the UAV 118 detaches itself from the vehicle 102.

Upon detachment from the vehicle 102, the UAV 118 moves (i.e., flies in air) within the communication range of the vehicle 102 such that the UAV 118 maintains communication with at least one of the vehicle device 104, the OBD device 106, the AVS device 108, the driver device 110, and the passenger device 112 over the second communication network 128. The UAV 118 may fly in all directions to search and detect the first communication network 126. Upon detection of the first communication network 126, the UAV 118 establishes the communication channel (such as the voice channel, the data channel, or the SMS channel) with the safety server 120 over the first communication network 126. Thereafter, the UAV 118 communicates the requisite information, such as the safety event and/or the metadata along with the UAV data, to the safety server 120 by means of the communication channel over the first communication network 126. Upon communication of the requisite information, the UAV 118 attaches itself with the vehicle 102. Also, in a scenario where the UAV 118 detaches itself from the vehicle 102 but fails to detect the first communication network 126 in the search or detection process performed during a configurable period of time, the UAV 118 attaches itself to the vehicle 102, and after another configurable period of time, the UAV 118 repeats the above described steps till the first communication network 126 is detected for communication with the safety server 120.

Figure 5B:
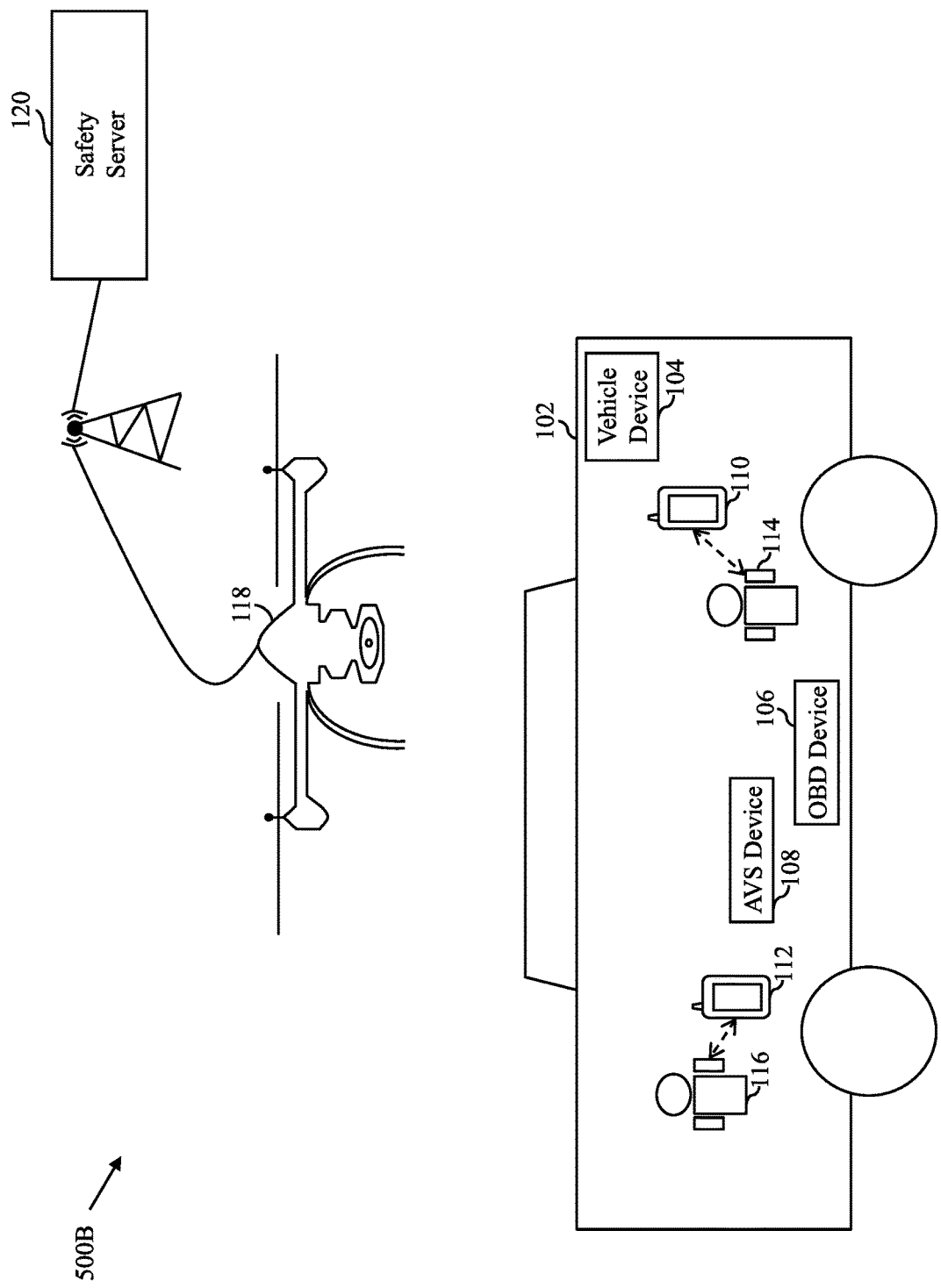
FIG. 5B is a block diagram that illustrates an exemplary environment for communicating the safety events to the safety server over the first communication network, in accordance with an exemplary embodiment of the disclosure.

FIG. 5B is a block diagram that illustrates an exemplary environment 500B for communicating the safety events (and/or the metadata along with the UAV data) to the safety server 120 over the first communication network 126, in accordance with an exemplary embodiment of the disclosure.

In continuation with the ongoing exemplary scenario as described above in FIG. 5A, in a scenario where the UAV 118 is unable to detect the first communication network 126 after a fixed number of trials (e.g., "2 times"), the UAV 118 moves out of the communication range of the vehicle 102 (that is still in motion). The UAV 118 may retrieve ongoing path information of the vehicle 102 from the driver device 110. The ongoing path information may include various path trajectories that will be followed by the driver 114 during the ride. The UAV 118 stores the path information in its memory 214 and then flies out of the communication range such that communication of the UAV 118 is disconnected with the vehicle device 104, the OBD device 106, the AVS device 108, the driver device 110, and the passenger device 112 over the second communication network 128. Thereafter, the UAV 118 may fly in all directions to search and detect the first communication network 126. Upon detection of the first communication network 126, the UAV 118 establishes the communication channel (such as the voice channel, the data channel, or the SMS channel) with the safety server 120 over the first communication network 126. Thereafter, the UAV 118 communicates the requisite information, such as the safety event and/or the metadata along with the UAV data, to the safety server 120 by means of the communication channel over the first communication network 126. In one embodiment, upon communication of the requisite information to the safety server 120, the UAV 118 follows or traces the stored path trajectories to detect the vehicle 102 and then attaches itself with the vehicle 102. In another embodiment, upon communication of the requisite information to the safety server 120, the UAV 118 may identify a nearest safety hotspot center based on the location coordinates of the various safety hotspot centers stored in its memory 214. Thereafter, the UAV 118 may fly down to the nearest safety hotspot center. In yet another embodiment, upon communication of the requisite information to the safety server 120, the UAV 118 may identify a nearest UAV service center (facilitated by the transport service provider) based on their location coordinates stored in its memory 214. Thereafter, the UAV 118 may fly down to the nearest UAV service center.

Figure 6A:
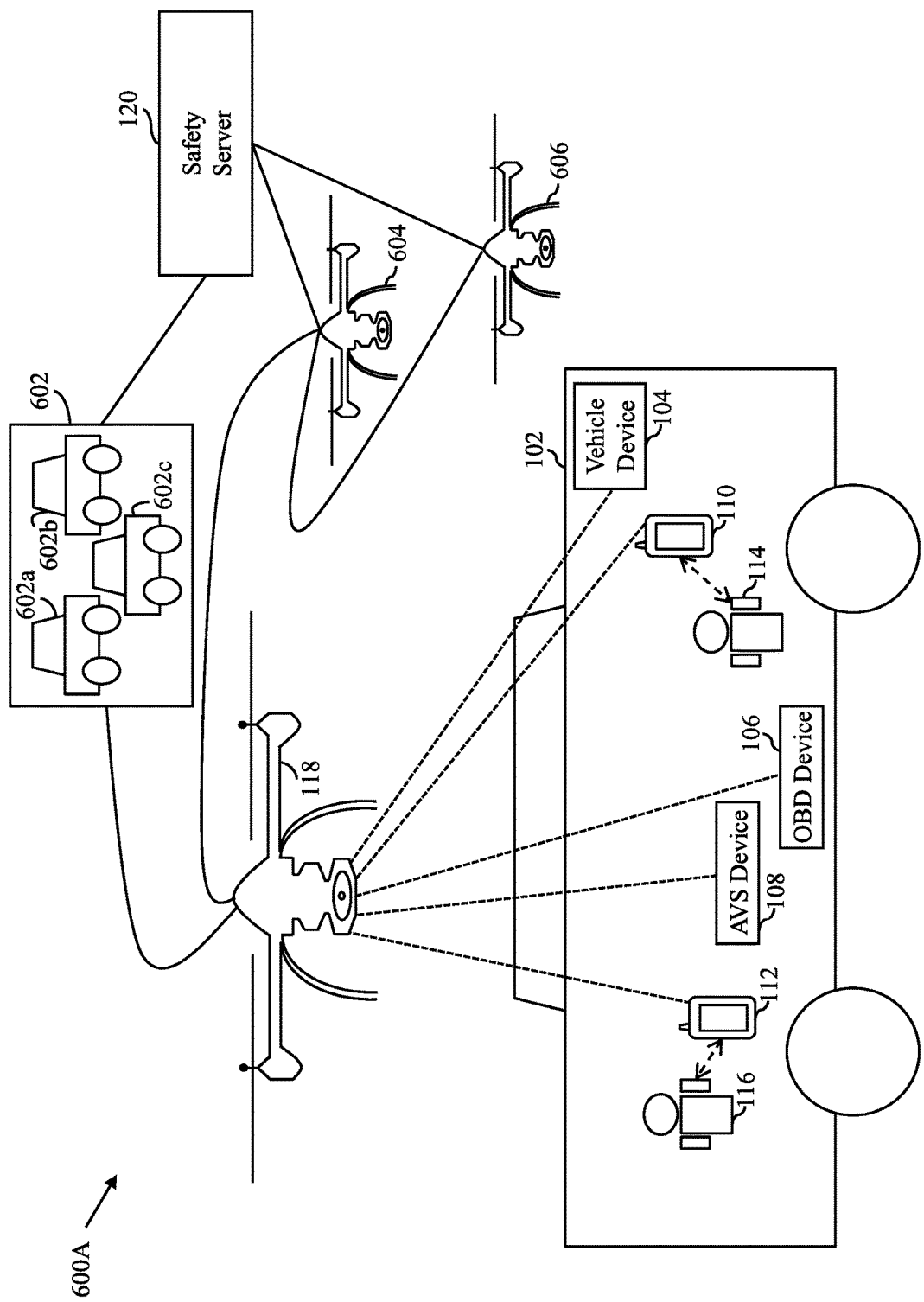
FIG. 6A is a block diagram that illustrates an exemplary environment for communicating the safety events to the safety server over a mesh communication network, in accordance with an exemplary embodiment of the disclosure.

FIG. 6A is a block diagram that illustrates an exemplary environment 600A for communicating the safety events (and/or the metadata along with the UAV data) to the safety server 120 over the mesh communication network, in accordance with an exemplary embodiment of the disclosure.

With reference to the exemplary environment 600A, it is assumed that the driver 114 is driving the vehicle 102 having the UAV 118 attached to it, for example, at the roof top of the vehicle 102. However, the vehicle 102 may also be stationary. Further, the vehicle 102 may or may not include any passenger. However, without limiting the scope of the disclosure, it is further assumed that the passenger 116 is inside the vehicle 102. Thus, the exemplary environment 600A shows the vehicle 102 including the vehicle device 104, the OBD device 106, the AVS device 108, the driver device 110 (associated with the driver 114), and the passenger device 112 (associated with the passenger 116), the UAV 118, and the safety server 120. The exemplary environment 600A further shows a set of vehicles 602, such as vehicles 602a-602c, and a set of UAVs, such as UAVs 604 and 606.

In an embodiment, the vehicle device 104, the OBD device 106, the AVS device 108, the driver device 110, and the passenger device 112 are communicatively connected with the UAV 118 over the second communication network 128 (shown by dotted lines in FIG. 6A). Further, the vehicle device 104, the OBD device 106, the AVS device 108, the driver device 110, and the passenger device 112 currently are not communicating with the safety server 120 due to unavailability of the third communication network 130. For example, when the strength of communication signal (associated with the third communication network 130) is weak or when the third communication network 130 is broken or lost or interrupted, the third communication network 130 may not be available for communication. Thus, when the third communication network 130 is not available for communication, the UAV 118 may transmit a query to at least one of the vehicle device 104, the OBD device 106, the AVS device 108, the driver device 110, and the passenger device 112 over the second communication network 128 and request for the metadata (such as the vehicle telemetry and metric data, the OBD data, the AVS data, the location data, or the like). The UAV 118 receives the metadata from at least one of the vehicle device 104, the OBD device 106, the AVS device 108, the driver device 110, and the passenger device 112 over the second communication network 128 and stores it in its memory 214.

Further, the UAV 118 may process the metadata along with the UAV data to check if any safety-related incident has occurred or not. In an event of occurrence of a safety event, the UAV 118 identifies a priority of the safety event based on the list of defined event-priority data set and generates an alert level (e.g., "high alert", "medium alert", "low alert", or "no alert") for the safety event based on the identified priority. For example, the priority of the safety event is identified as "low alert" or "medium alert". In such a scenario, the UAV 118 may perform a check to determine whether the first communication network 126 is available or unavailable for communication with the safety server 120. In a scenario where the first communication network 126 is available for communication with the safety server 120, the UAV 118 (that is attached to the vehicle 102) communicates the safety event and/or the metadata along with the UAV data to the safety server 120 over the first communication network 126 irrespective of the priority of the safety event. However, when the first communication network 126 is not available for communication for a configurable period of time due to weak signal strength or any other technical or non-technical interruption, the UAV 118 detaches itself from the vehicle 102.

Upon detachment from the vehicle 102, the UAV 118 moves (i.e., flies in air) within the communication range of the vehicle 102 such that the UAV 118 maintains communication with at least one of the vehicle device 104, the OBD device 106, the AVS device 108, the driver device 110, and the passenger device 112 over the second communication network 128. The UAV 118 may fly in all directions to search and detect the first communication network 126. Upon detection of the first communication network 126, the UAV 118 establishes the communication channel (such as the voice channel, the data channel, or the SMS channel) with the safety server 120 over the first communication network 126 and communicates the requisite information, such as the safety event and/or the metadata along with the UAV data, to the safety server 120. However, in a scenario where the UAV 118 detaches itself from the vehicle 102 but fails to detect the first communication network 126 in the search or detection process performed during a configurable period of time, the UAV 118 starts searching or detecting for the vehicle devices (and/or UAVs) associated with other vehicles (e.g., the set of vehicles 602) or other independent UAVs (e.g., UAVs 604 and 606). The other vehicles and UAVs may be associated with the transport service provider or a third-party service provider. For example, the other vehicles and UAVs may correspond to "OLA vehicles" and "OLA UAVs", "partnered vehicles" and "partnered UAVs", or a combination thereof.

Thereafter, the UAV 118 establishes the chain of communications (i.e., the mesh communication network) by means of the vehicle devices (and/or UAVs) associated with the set of vehicles 602 and/or the UAVs 604 and 606 and communicates the safety event and/or the metadata along with the UAV data to the safety server 120 over the mesh communication network. In one example, the UAV 118 communicates the safety event and/or the metadata along with the UAV data to a vehicle device (not shown) of the vehicle 602a that further communicates it to the safety server 120. In another example, the UAV 118 communicates the safety event and/or the metadata along with the UAV data to the vehicle device of the vehicle 602a that further communicates it to a vehicle device (not shown) of the vehicle 602b that further communicates it to the safety server 120. In yet another example, the UAV 118 communicates the safety event and/or the metadata along with the UAV data to the vehicle device of the vehicle 602a that further communicates it to the vehicle device of the vehicle 602b that further communicates it to a vehicle device (not shown) of the vehicle 602c that further communicates it to the safety server 120. In yet another example, the UAV 118 communicates the safety event and/or the metadata along with the UAV data to the UAV 604 that further communicates it to the safety server 120. In yet another example, the UAV 118 communicates the safety event and/or the metadata along with the UAV data to the UAV 604 that further communicates it to the UAV 606 that further communicates it to the safety server 120. In yet another example, the UAV 118 may communicate the safety event and/or the metadata along with the UAV data to the vehicle device of the vehicle 602a that further communicates it to the UAV 604 that further communicates it to the safety server 120. In yet another example, the UAV 118 may communicate the safety event and/or the metadata along with the UAV data to the vehicle device of the vehicle 602a that further communicates it to the UAV 604 that further communicates it to the vehicle device of the vehicle 602c that further communicates it to the UAV 606 that further communicates it to the safety server 120. As described above with few examples, the UAV 118 may establish the mesh communication network by means of the vehicle devices (and/or UAVs) associated with the set of vehicles 602 and/or the set of UAVs (such as the UAVs 604 and 606) and communicates the safety event and/or the metadata along with the UAV data to safety server 120. Also, during the entire process of communicating the safety event and/or the metadata along with the UAV data to safety server 120 over the mesh communication network, the UAV 118 flies within the communication range of the vehicle 102.

Also, during such processes, the UAV 118 keeps the LED sensor 210 in a turn-on mode that emits light in a particular pattern or color (as configured by the safety center). The particular pattern or color may indicate the current status of operation as well as the current status or priority of the safety event. The pattern or color of light may change (e.g., from one pattern or color to another pattern or color) from one-time instance to another time instance that reflects real-time changes in the status of operation and the safety event. Such implementations may help the rescue teams to identify the incident location associated with the safety event.

Figure 6B:
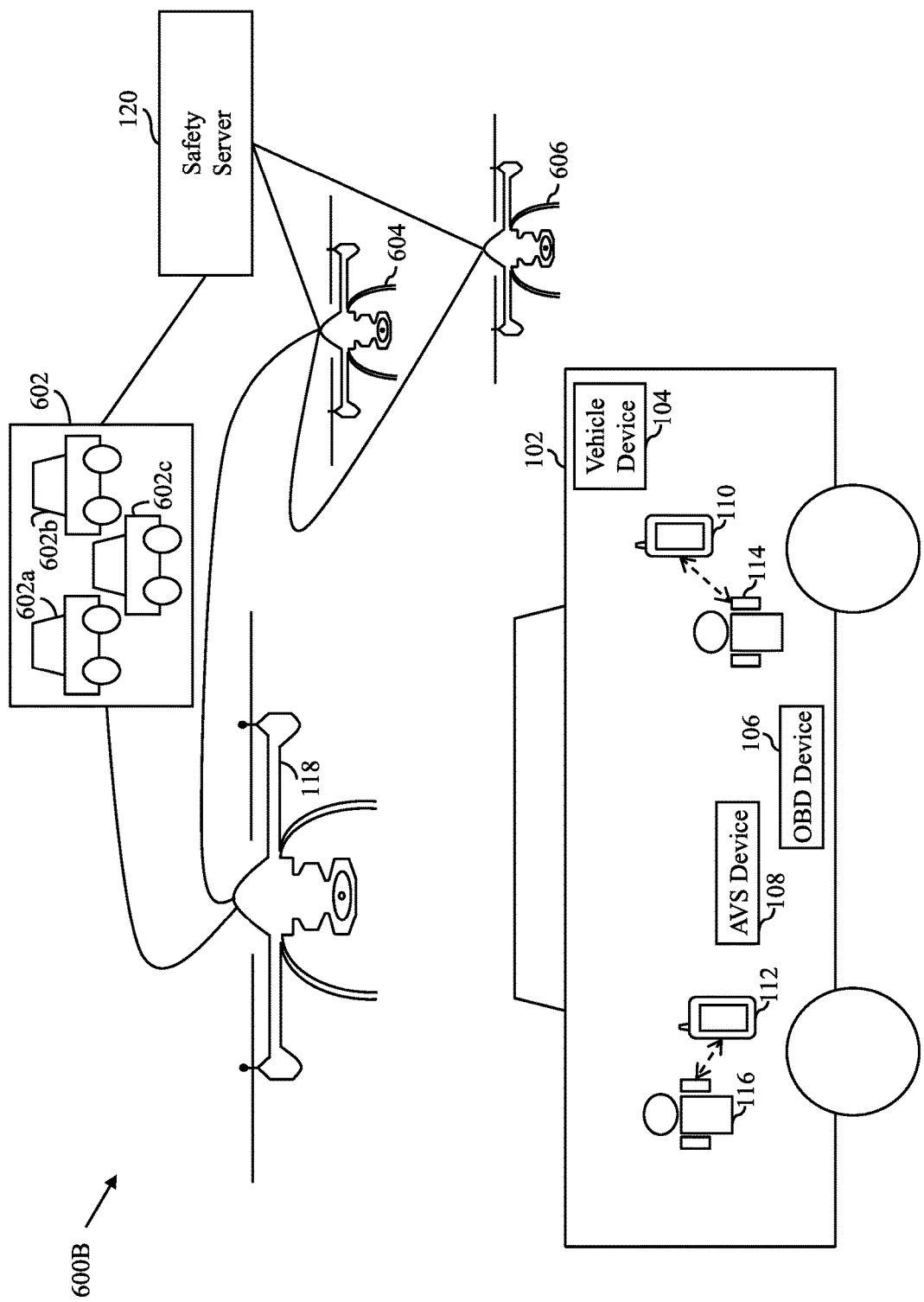
FIG. 6B is a block diagram that illustrates an exemplary environment for communicating the safety events to the safety server over the mesh communication network, in accordance with an exemplary embodiment of the disclosure.

FIG. 6B is a block diagram that illustrates an exemplary environment 600B for communicating the safety events (and/or the metadata along with the UAV data) to the safety server 120 over the mesh communication network, in accordance with an exemplary embodiment of the disclosure.

In continuation with the ongoing exemplary scenario as described above in FIG. 6A, in a scenario where the UAV 118 is unable to detect the vehicle devices and/or UAVs for establishing the mesh communication network, the UAV 118 moves out of the communication range of the vehicle 102. The UAV 118 flies out of the communication range such that communication of the UAV 118 is disconnected with the vehicle device 104, the OBD device 106, the AVS device 108, the driver device 110, and the passenger device 112 over the second communication network 128. Thereafter, the UAV 118 may fly in all directions to search and detect the vehicle devices (and/or UAVs) associated with the set of vehicles 602 and/or the set of UAVs such as the UAVs 604 and 606. Upon detection of the vehicle devices (and/or UAVs) associated with the set of vehicles 602 and/or the UAVs 604 and 606, the UAV 118 establishes the mesh communication network, as described above in conjunction with FIG. 6A. Thereafter, the UAV 118 communicates the requisite information, such as the safety event and/or the metadata along with the UAV data, to the safety server 120 by means of the set of vehicles 602 and/or the UAVs 604 and 606 over the mesh communication network that has been established therebetween.

In few scenarios where the priority of the safety event is "high alert" and the UAV 118 is unable to detect the first communication network 126 as well as the vehicle devices and/or UAVs for establishing the mesh communication network, the UAV 118 moves out of the communication range of the vehicle 102 (that is either in motion or stationary). The UAV 118 flies out of the communication range such that communication of the UAV 118 is disconnected with the vehicle device 104, the OBD device 106, the AVS device 108, the driver device 110, and the passenger device 112 over the second communication network 128. Thereafter, the UAV 118 flies towards the safety hotspot center that is nearest to the vehicle 102 and communicates the requisite information. The nearest safety hotspot center may be identified based on the location coordinates of the various safety hotspot centers stored in the memory 214. However, during the process of flying towards the nearest safety hotspot center, the UAV 118 continues to detect for the first communication network 126 and/or the vehicle devices or UAVs, for communicating the requisite information to the safety server 120. Upon communication of the requisite information (i.e., the safety events and/or the metadata along with the UAV data) to the safety server 120 or the safety hotspot center, the UAV 118 may fly back to the vehicle 102 and attaches itself. In another embodiment, the UAV 118 may fly back to the vehicle 102 and then may perform the audio and video surveillance of the surrounding including at least the vehicle 102, the driver 114, or the passenger 116, update the incident location, if required, keep the LED sensor 210 in the turn-on mode based on the current priority, or a combination thereof.

Figure 7:
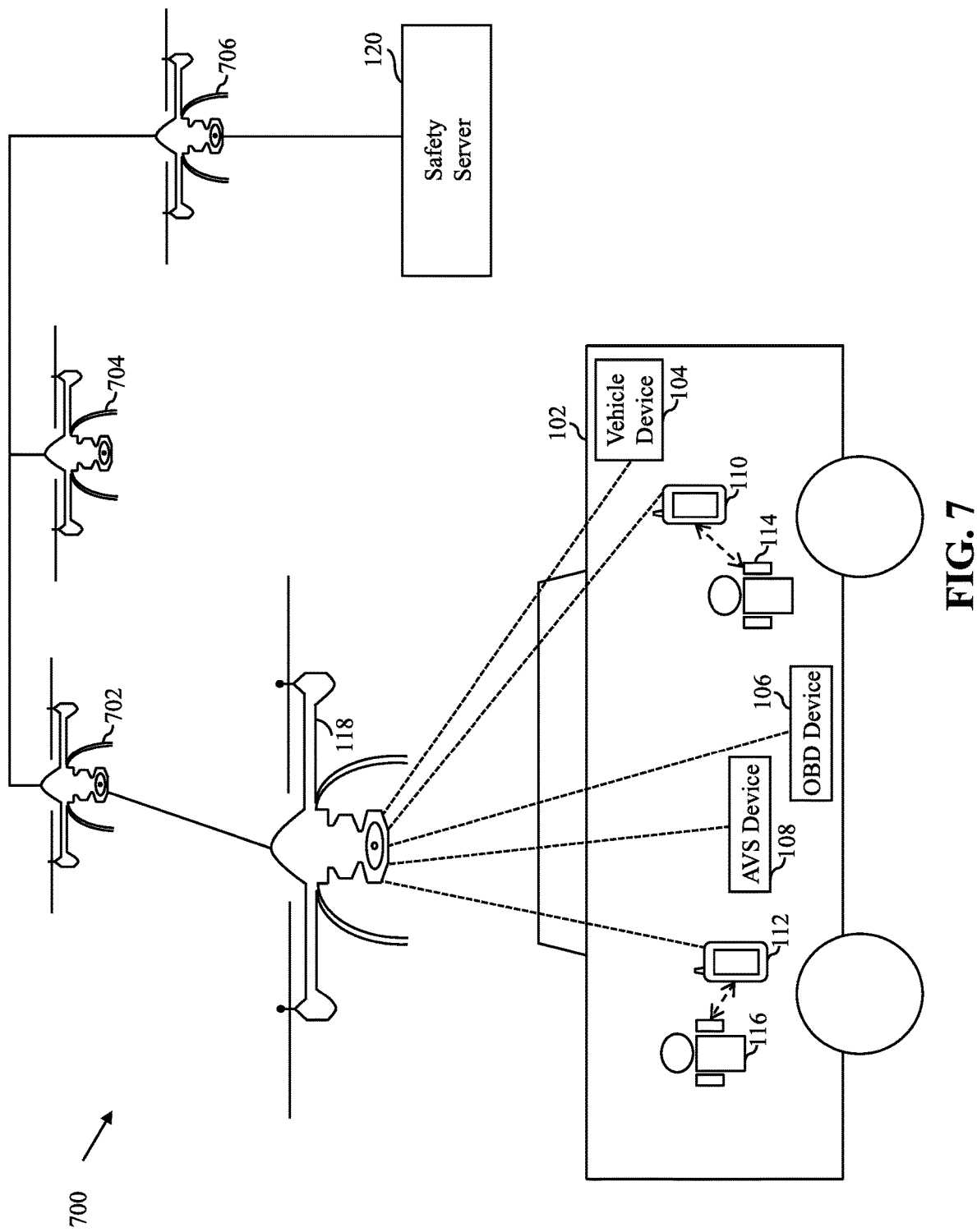
FIG. 7 is a block diagram that illustrates an exemplary environment for tracking a vehicle, a driver, and a passenger of the environment of FIG. 1, in accordance with an exemplary embodiment of the disclosure.

FIG. 7 is a block diagram that illustrates an exemplary environment 700 for tracking the vehicle 102, the driver 114, and the passenger 116, in accordance with an exemplary embodiment of the disclosure. The exemplary environment 700 shows the vehicle 102 including the vehicle device 104, the OBD device 106, the AVS device 108, the driver device 110 (associated with the driver 114), and the passenger device 112 (associated with the passenger 116), the UAV 118, and the safety server 120. The exemplary environment 700 further shows UAVs 702-706.

Upon successful communication of the safety events and/or the metadata along with the UAV data and their corresponding priorities to safety server 120, the safety server 120 dispatches a set of UAVs, such as the UAVs 702-706, for tracking the vehicle 102, the driver 114, and the passenger 116. The UAVs 702-706 navigate the location coordinates of the incident location and accordingly fly to reach the incident location. In an embodiment, when the vehicle 102, the driver 114, and the passenger 116 are scattered (i.e., they are at different locations), the UAV 702 may fly to track the vehicle 102, the UAV 704 may fly to track the driver 114, and the UAV 706 may fly to track the passenger 116. Also, each of the UAVs 702-706 may maintain continuous communication with each other along with the UAV 118 and the safety server 120, either directly or by means of each other. Such communication may be maintained until the safety events are resolved. Also, various functionalities and operations of the UAVs 702-706 are similar to various functionalities and operations of the UAV 118, as described above.

Figure 8A:
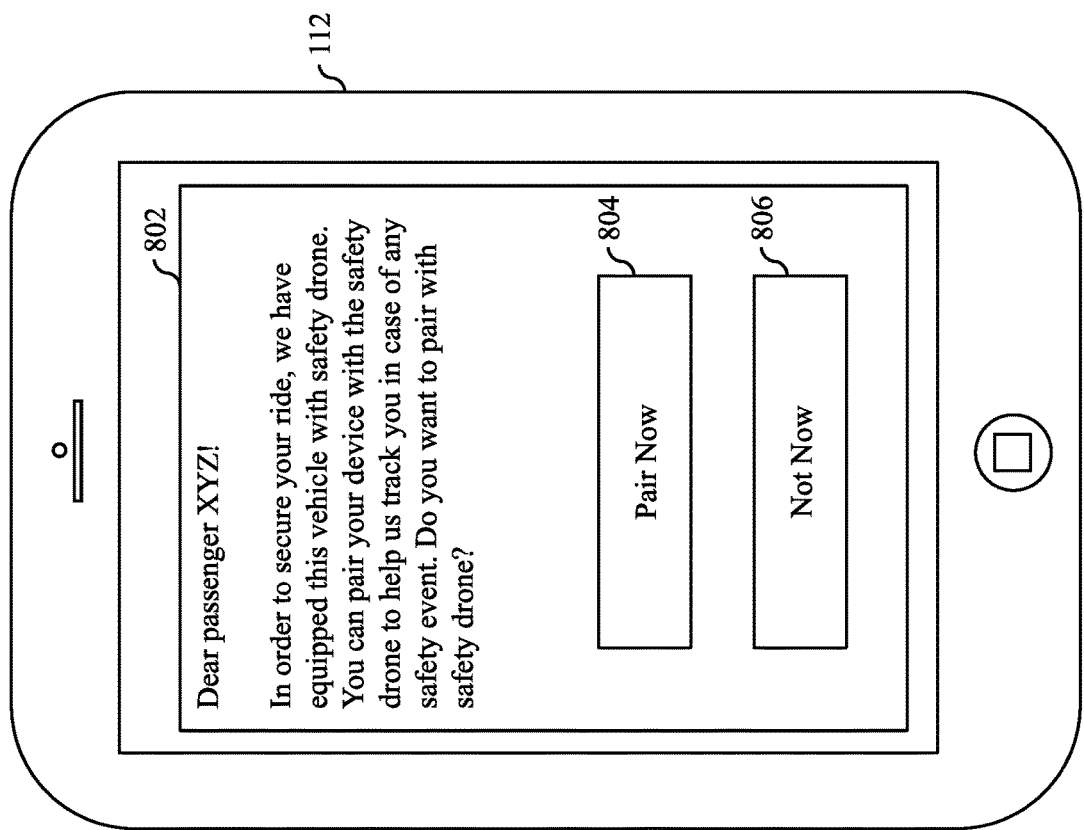
FIGS. 8A-8C are block diagrams that illustrate safety notification interfaces rendered on a passenger device of the environment of FIG. 1, in accordance with an exemplary embodiment of the disclosure.
Figure 8B:
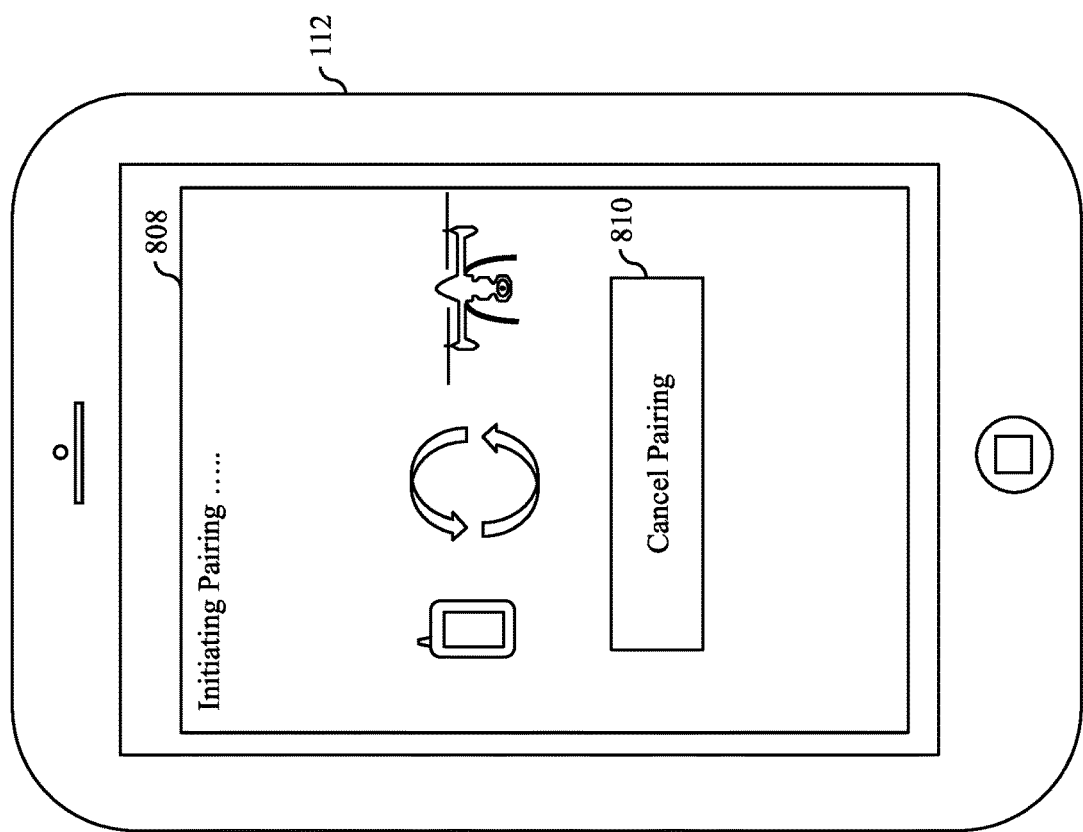
Figure 8C:
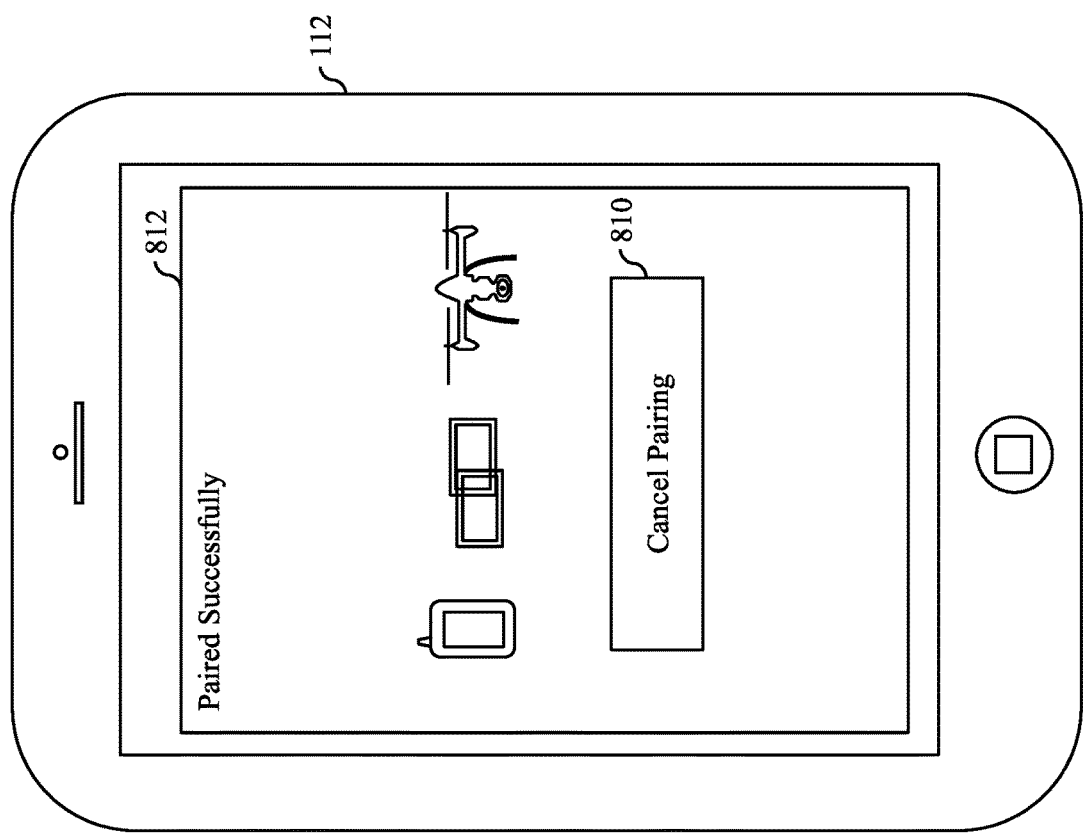

FIGS. 8A-8C are block diagrams that illustrate safety notification interfaces rendered on the passenger device 112, in accordance with an exemplary embodiment of the disclosure.

With reference to FIG. 8A, the passenger device 112 displays the safety notification interface 802 on its display by means of the installed service application. The safety notification interface 802 is rendered by the transportation server 122, when the passenger 116 has boarded the allocated vehicle, such as the vehicle 102, and the driver 114 has provided the input to start the ride from the source location of the passenger 116. The transportation server 122 controls and manages various content, messages, and/or options that need to be displayed on the safety notification interface 802. For example, the safety notification interface 802 may present a notification message for notifying the passenger 116 about the drone-based safety service associated with the vehicle 102. In an exemplary scenario, the notification message may be displayed as "Dear passenger XYZ! In order to secure your ride, we have equipped this vehicle with safety drone. You can pair your device with the safety drone to help us track you in case of any safety event. Do you want to pair with safety drone?" as shown in FIG. 8A.

The safety notification interface 802 may further present the options, including first and second options 804 and 806, along with various terms and conditions (not shown in FIG. 8A) for facilitating the drone-based safety service. The transportation server 122 may display a first message (e.g., "Pair Now") and a second message (e.g., "Not Now") corresponding to the first option 804 and the second option 806, respectively, as shown. The first option 804 may be selectable by the passenger 116 for accepting pairing of the passenger device 112 with a safety drone, such as the UAV 118, that is attached with the vehicle 102 for providing the drone-based safety service during the ride. The second option 806 may be selectable by the passenger 116 for declining pairing of the passenger device 112 with the UAV 118.

In a scenario where the passenger 116 provides an input to select the second option 806 on the safety notification interface 802, the transportation server 122 automatically withdraws the safety notification interface 802 presented on the passenger device 112. In another scenario where the passenger 116 provides an input to select the first option 804 on the safety notification interface 802, the transportation server 122 renders an updated version of the safety notification interface 802, such as a safety notification interface 808, on the passenger device 112, as shown in FIG. 8B.

With reference to FIG. 8B, the passenger device 112 displays the safety notification interface 808 on its display by means of the installed service application. The safety notification interface 808 is rendered by the transportation server 122, when the passenger 116 has accepted pairing of the passenger device 112 with the UAV 118 by selecting the first option 804 on the safety notification interface 802. The transportation server 122 further controls and manages various content, messages, and/or options that need to be displayed on the safety notification interface 808. For example, the safety notification interface 808 may present a notification message for notifying the passenger 116 about initiation of a pairing process between the passenger device 112 and the UAV 118. In an exemplary scenario, the notification message may be displayed as "Initiating Pairing" as shown in FIG. 8B. The safety notification interface 802 may further present a third option 810 that allows the passenger 116 to cancel the pairing process between the passenger device 112 and the UAV 118. The transportation server 122 may display a third message (e.g., "Cancel Pairing") corresponding to the third option 810, as shown. In a scenario where the passenger 116 does not cancel the pairing process, the transportation server 122 renders an updated version of the safety notification interface 808, such as a safety notification interface 812, on the passenger device 112, as shown in FIG. 8C.

With reference to FIG. 8C, the passenger device 112 displays the safety notification interface 812 on its display by means of the installed service application. The safety notification interface 812 is rendered by the transportation server 122, when the passenger 116 has not canceled the pairing process. The transportation server 122 further controls and manages various content, messages, and/or options that need to be displayed on the safety notification interface 812. For example, the safety notification interface 808 may present a notification message for notifying the passenger 116 about successful pairing of the passenger device 112 with the UAV 118. In an exemplary scenario, the notification message may be displayed as "Paired Successfully", as shown in FIG. 8B. The safety notification interface 812 may also present the third option 810 that allows the passenger 116 to cancel the established pairing between the passenger device 112 and the UAV 118 at any time during the ride after successful pairing of the passenger device 112 with the UAV 118.

Figure 9:
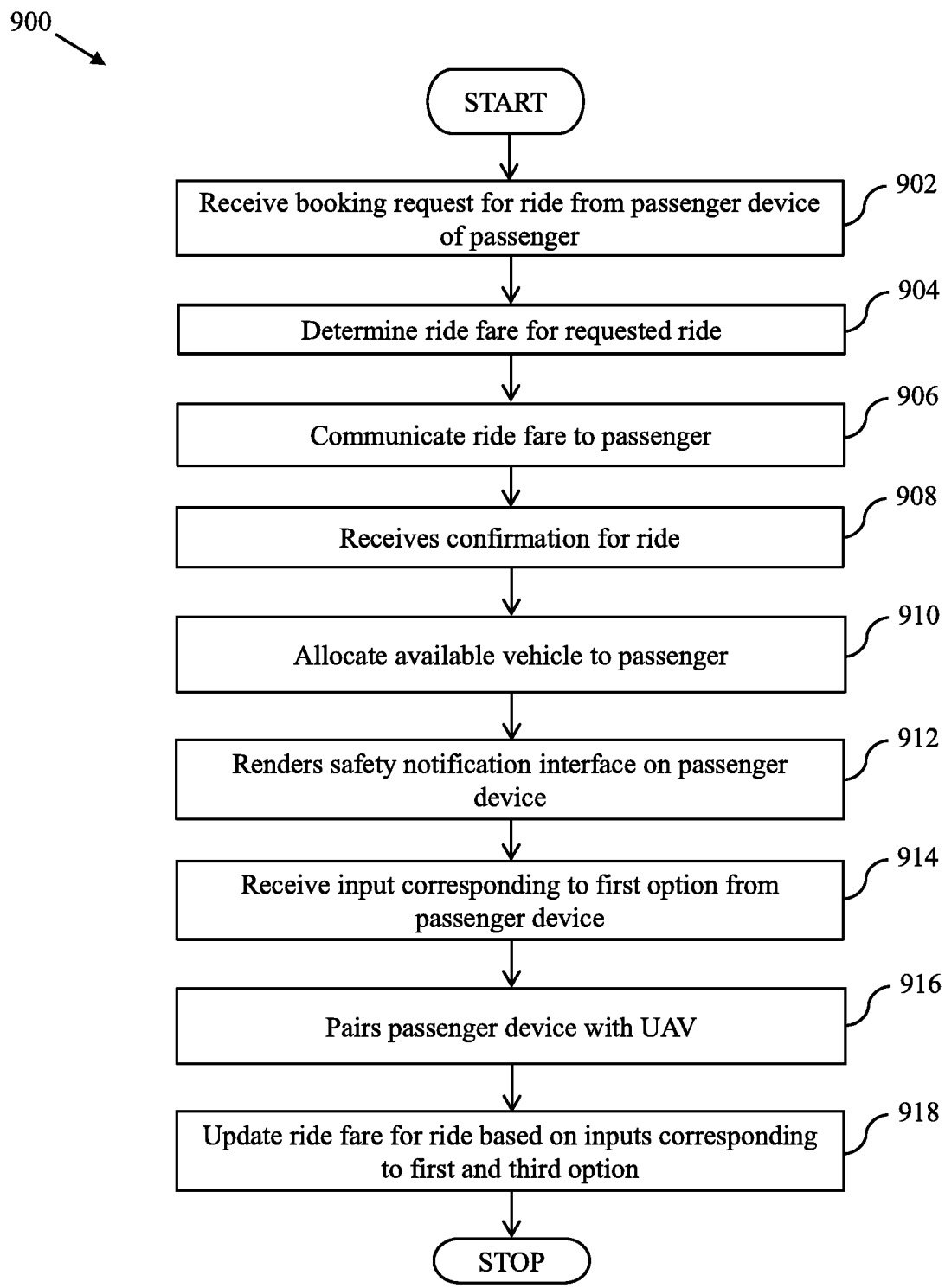
FIG. 9 is a flow chart that illustrates a method for dynamically updating a ride fare during a ride, in accordance with an exemplary embodiment of the disclosure.

FIG. 9 is a flow chart 900 that illustrates a method for dynamically updating the ride fare during the ride, in accordance with an exemplary embodiment of the disclosure.

At step 902, the transportation server 122 receives the booking request for the ride from the passenger device 112 over the third communication network 130. The booking request includes the ride-related information, such as the preferred vehicle type, the source location, the destination location, the preferred pick-up time, or other service-related details and preferences specified by the passenger 116.

At step 904, the transportation server 122 determines the ride fare for the ride requested by the passenger 116. The ride fare may be determined based on at least one of the ride-related information, the real-time traffic conditions between the source and destination locations, the estimated ride time for transporting the passenger 116 from the source location to the destination, the ride distance between the source and destination locations, or a combination thereof. For example, the ride fare is determined as "INR 200" for the ride.

At step 906, the transportation server 122 communicates the ride fare to the passenger 116. The transportation server 122 renders the fare notification interface on the passenger device 112. The fare notification interface presents at least the ride fare (i.e., "INR 200") along with the estimated time of pick-up from the source location. Based on at least the ride fare, the passenger 116 may tap on an option (e.g., "confirm" or "cancel" option) on the fare notification interface to either confirm or cancel the ride.

At step 908, the transportation server 122 receives confirmation for the ride from the passenger device 112 when the passenger 116 has tapped the "confirm" option on the fare notification interface to confirm the ride based on the ride fare (e.g., "INR 200"). At step 910, the transportation server 122 allocates an available vehicle, such as the vehicle 102, to the passenger 116 for the ride based on the received confirmation from the passenger device 112. The vehicle 102 is equipped with the UAV 118 for providing the drone-based safety service. For example, when the safety events are detected during the ride, the UAV 118 can communicate the safety events (and/or the metadata along with UAV data) to the safety server 120 based on the safety criterion including at least detachment of the UAV 118 from the vehicle 102.

At step 912, the transportation server 122 renders the safety notification interface 802 on the passenger device 112 for providing the drone-based safety service to the passenger 116, when the passenger 116 has boarded the vehicle 102 for the ride and the driver 114 has provided the input to start the ride from the source location. The safety notification interface 802 presents the options, including the first and second options 804 and 806, along with various terms and conditions for facilitating the drone-based safety service. When the passenger 116 wants to avail the drone-based safety service, the passenger 116 may select the first option 804 to accept pairing of the passenger device 112 with the UAV 118. When the passenger 116 does not want to avail the drone-based safety service, the passenger 116 may select the second option 806 to decline pairing of the passenger device 112 with the UAV 118. The safety notification interface 802 may further present a charge rate (e.g., "INR 5 per minute) for availing the drone-based safety service during the ride. The drone-based safety service may be availed by the passenger 116 for any number of times during the ride.

At step 914, the transportation server 122 receives an input corresponding to the first option 804 from the passenger device 112. At step 916, the transportation server 122 pairs the passenger device 112 with the UAV 118 based on the first option 804 selected by the passenger. Upon successful pairing of the passenger device 112 with the UAV 118, the transportation server 122 may render the safety notification interface 812 on the passenger device 112. During the ride, the passenger 116 may select the third option 810 on the safety notification interface 812 to cancel pairing of the passenger device 112 with the UAV 118. The passenger 116 may provide the inputs to select the first and third options 804 and 810.

At step 918, the transportation server 122 updates the ride fare for the ride based on the inputs (corresponding to the first and third options 804 and 810) provided by the passenger 116 during the ride. Based on the inputs, the transportation server 122 determines each time duration for which the passenger 116 has availed the drone-based safety service during the ride. For example, the ride started at "9:00 PM" and ended at "9:50 PM" for which the ride fare was determined as "INR 200". During the ride, the passenger 116 selected the first option 804 at "9:10 PM" and then selected the third option at "9:15 PM". The passenger 116 further selected the first option 804 at "9:30 PM" and then selected the third option at "9:45 PM". Thus, the passenger 116 has availed the drone-based safety service for two times during the ride i.e., for the time durations of "5 minutes" and "15 minutes" and in total, for "20 minutes" during the ride of "50 minutes". The transportation server 122 further determines an additional service fee for availing the drone-based safety service based on the total time durations (i.e., "20 minutes" in the instant example) for which the passenger 116 has availed the drone-based safety service during the ride. For example, the additional service fee is determined as "INR 100" (i.e., "INR 5 per minute" *"20 minutes"). Thus, the updated ride fare for the ride is determined as "INR 300" (i.e., "INR 200"+"INR 100"). The passenger 116 may be prompted to pay "INR 300" after completion of the ride. The passenger 116 may pay the ride fare for the ride (i.e., "INR 300") either in cash or using digital money.

Figure 10:
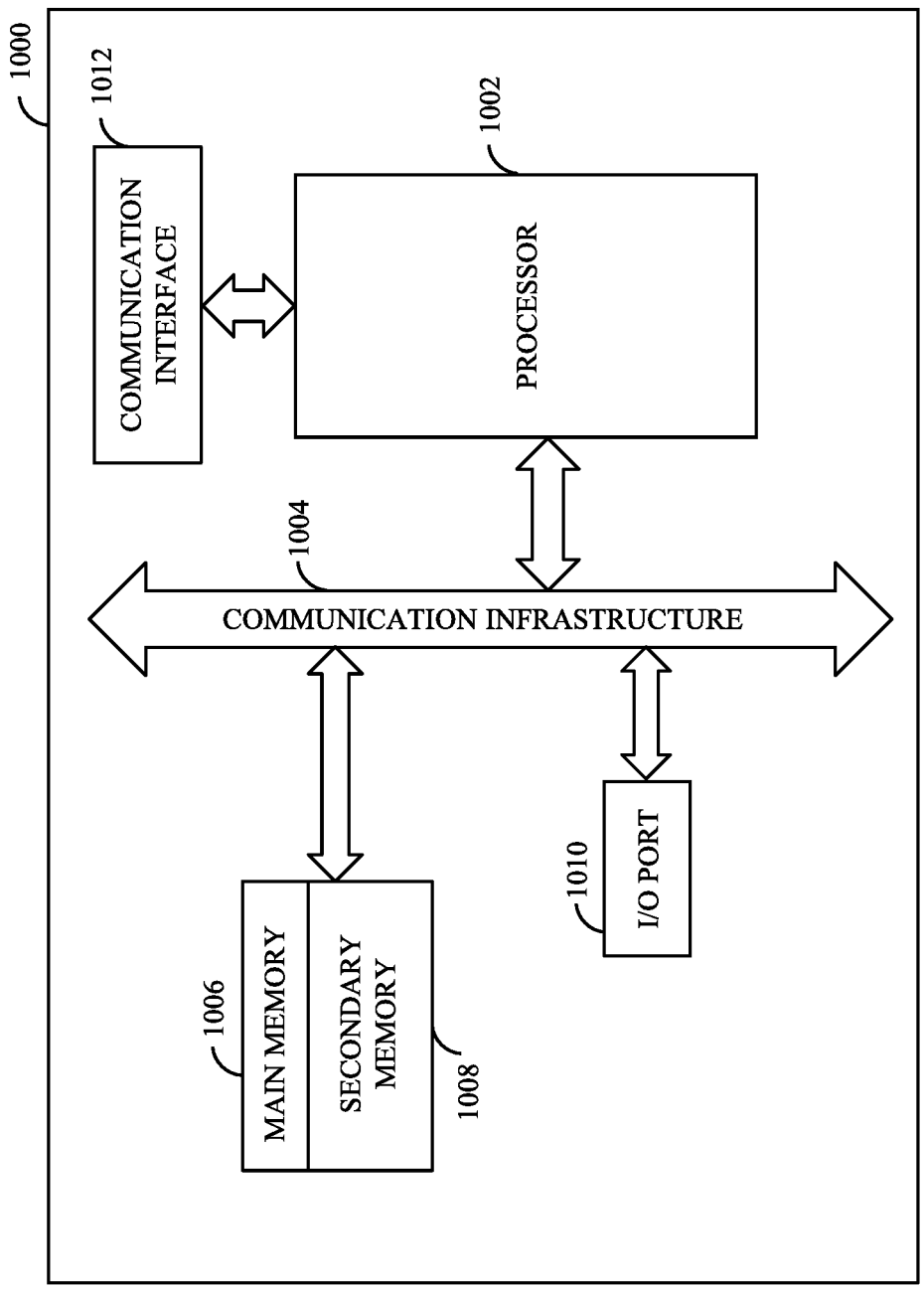
FIG. 10 is a block diagram that illustrates a computer system for dynamically updating the ride fare during the ride, in accordance with an exemplary embodiment of the disclosure.

FIG. 10 is a block diagram that illustrates a computer system 1000 for dynamically updating the ride fare during the ride, in accordance with an exemplary embodiment of the disclosure. An embodiment of the disclosure, or portions thereof, may be implemented as computer readable code on the computer system 1000. In one example, the safety server 120, the transportation server 122, and the database server 124 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 9.

The computer system 1000 includes a processor 1002 that may be a special purpose or a general-purpose processing device. The processor 1002 may be a single processor, multiple processors, or combinations thereof. The processor 1002 may have one or more processor "cores." Further, the processor 1002 may be connected to a communication infrastructure 1004, such as a bus, a bridge, a message queue, the first, second, and third communication networks 126, 128, and 130, multi-core message-passing scheme, or the like. The computer system 1000 further includes a main memory 1006 and a secondary memory 1008. Examples of the main memory 1006 may include RAM, ROM, and the like. The secondary memory 1008 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 1000 further includes an I/O port 1010 and a communication interface 1012. The I/O port 1010 includes various input and output devices that are configured to communicate with the processor 1002. Examples of the input devices may include a keyboard, a mouse, a joystick, a touchscreen, a microphone, and the like. Examples of the output devices may include a display screen, a speaker, headphones, and the like. The communication interface 1012 may be configured to allow data to be transferred between the computer system 1000 and various devices that are communicatively coupled to the computer system 1000. Examples of the communication interface 1012 may include a modem, a network interface, i.e., an Ethernet card, a communications port, and the like. Data transferred via the communication interface 1012 may be signals, such as electronic, electromagnetic, optical, or other signals as will be apparent to a person skilled in the art. The signals may travel via a communications channel, such as the first, second, or third communication network 126, 128, or 130 which may be configured to transmit the signals to the various devices that are communicatively coupled to the computer system 1000. Examples of the communication channel may include, but are not limited to, cable, fiber optics, a phone line, a cellular phone link, a radio frequency link, a wireless link, and the like.

Computer program medium and computer usable medium may refer to memories, such as the main memory 1006 and the secondary memory 1008, which may be a semiconductor memory such as dynamic RAMs. These computer program mediums may provide data that enables the computer system 1000 to implement the method illustrated in FIG. 9. In an embodiment, the disclosure is implemented using a computer implemented application. The computer implemented application may be stored in a computer program product and loaded into the computer system 1000 using the removable storage drive or the hard disc drive in the secondary memory 1008, the I/O port 1010, or the communication interface 1012.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 1002, and a memory, such as the main memory 1006 and the secondary memory 1008, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for allocating seats for the share-ride in the ride-sharing system. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. An unmanned aerial vehicle (UAV), attached to a vehicle, the UAV comprising:
    a processor;
    a communication module configured to communicate with a safety server via a first communication network and a vehicle device of the vehicle, a driver device of a driver of the vehicle, an on-board diagnostic (OBD) device of the vehicle, and a passenger device of a passenger in the vehicle via a second communication network that is different from the first communication network;
    a memory configured to store one or more instructions, which when executed by the processor, the processor is configured to:
        identify a network status of a third communication network via which the vehicle device, the driver device, the OBD device, and the passenger device communicate with the safety server, wherein the third communication network is different from the first communication network and the second communication network;
        receive metadata that includes location data from the vehicle device, the driver device, the OBD device, or the passenger device via the second communication network, based on the network status of the third communication network being unavailable;
        process UAV data and the received metadata to detect one or more safety events, wherein the UAV data is generated based on real-time position information of the vehicle and real-time images or videos of the vehicle and surroundings of the vehicle; and
        communicate the one or more safety events or the metadata along with the UAV data to the safety server based on a safety criterion that comprises detachment of the UAV from the vehicle when the first communication network is unavailable for communication with the safety server.

2. The UAV of claim 1, further comprising one or more image-capturing sensors and position-tracking sensors configured to capture the real-time images or videos of the vehicle and the surroundings of the vehicle and the real-time position information of the vehicle, respectively.

3. The UAV of claim 1, further comprising one or more light-emitting diode (LED) sensors configured to emit different patterns of light based on a degree of severity of the one or more safety events, wherein the degree of severity is associated with a priority assigned to each of the detected one or more safety events.

4. The UAV of claim 3, wherein the priority is assigned to each of the detected one or more safety events based on an event-priority data set stored in a database server, wherein the event-priority data set includes a plurality of safety events and a corresponding priority of each of the plurality of safety events, and wherein the priority includes one of a high priority event, a medium priority event, or a low priority event.

5. The UAV of claim 1, wherein the communication module is configured to communicate with the driver device and the passenger device based on a login status of the driver and a preference of the passenger to pair the UAV with the passenger device, respectively, and wherein the communication module communicates with the safety server via the first communication network by means of one or more channels that comprises a voice channel, a data channel, or a short messaging service (SMS) channel.

6. The UAV of claim 1, wherein the metadata further includes information that corresponds to arguments between the driver and the passenger, anomalies with respect to driving of the vehicle by the driver, vehicle's health, accidents associated with the vehicle, or malicious intent in driver's or passenger's behavior.

7. The UAV of claim 1, wherein the processor is further configured to trigger detachment of the UAV from the vehicle, and when detached, the UAV moves within a communication range of the vehicle, while communication with at least one of the vehicle device, the driver device, the OBD device, or the passenger device via the second communication network is maintained, to detect the first communication network to establish communication with the safety server for communicating the one or more safety events or the metadata along with the UAV data to the safety server.

8. The UAV of claim 1, wherein the processor is further configured to trigger detachment of the UAV from the vehicle, and when detached, the UAV moves out of a communication range of the vehicle, while communication with the vehicle device, the driver device, the OBD device, and the passenger device via the second communication network is disconnected, to detect the first communication network to establish communication with the safety server for communicating the one or more safety events or the metadata along with the UAV data to the safety server.

9. The UAV of claim 1, wherein the processor is further configured to trigger detachment of the UAV from the vehicle, and when detached, the UAV moves within a communication range of the vehicle, while communication with at least one of the vehicle device, the driver device, the OBD device, or the passenger device via the second communication network is maintained, to detect one or more vehicle devices or UAVs associated with other vehicles to establish a chain of communications with the one or more vehicle devices or UAVs for communicating the one or more safety events or the metadata along with the UAV data to the safety server.

10. The UAV of claim 1, wherein the processor is further configured to trigger detachment of the UAV from the vehicle, and when detached, the UAV moves out of a communication range of the vehicle, while communication with the vehicle device, the driver device, the OBD device, and the passenger device via the second communication network is disconnected, to detect one or more vehicle devices or UAVs associated with other vehicles to establish a chain of communications with the one or more vehicle devices or UAVs for communicating the one or more safety events or the metadata along with the UAV data to the safety server.

11. The UAV of claim 1, wherein the processor is further configured to trigger detachment of the UAV from the vehicle, and when detached, the UAV moves out of a communication range of the vehicle, while communication with the vehicle device, the driver device, the OBD device, and the passenger device via the second communication network is disconnected, and travels towards a safety hotspot center that is nearest to the vehicle based on location coordinates of the safety hotspot center stored in the memory,
wherein the UAV continues to detect the first communication network or one or more vehicle devices or UAVs to establish a chain of communications, for communicating the one or more safety events or the metadata along with the UAV data to the safety server while travelling towards the safety hotspot center.

12. The UAV of claim 11, wherein the processor is further configured to trigger attachment of the UAV with the vehicle after the communication of the one or more safety events or the metadata along with the UAV data to the safety server or the safety hotspot center.

13. A vehicle allocation method, comprising:
receiving, by circuitry of a transportation server, from a passenger device of a passenger, a booking request for a ride between source and destination locations specified by the passenger in the booking request;
communicating, by the circuitry, to the passenger, a ride fare for the ride based on the booking request;
allocating, by the circuitry, a vehicle to the passenger based on confirmation of the ride fare provided by the passenger, wherein the vehicle is equipped with an unmanned aerial vehicle (UAV) that (i) identifies a network status of a first communication network via which at least one of a vehicle device of the vehicle, a driver device associated with the vehicle, and an on-board diagnostic (OBD) device of the vehicle communicate with a safety server, and (ii) communicates one or more safety events to the safety server via a second communication network based on the identified network status being unavailable and a safety criterion comprising detachment of the UAV from the vehicle when second communication network is unavailable for communication with the safety server in an attached configuration of the UAV with the vehicle, and wherein the first communication network is different from the second communication network;
rendering, by the circuitry, a user interface on the passenger device when a driver of the vehicle provides an input to start the ride from a source location, wherein the user interface presents a first option that is selectable by the passenger for accepting pairing of the passenger device with the UAV and a second option that is selectable by the passenger for declining pairing of the passenger device with the UAV;
receiving, by the circuitry, from the passenger device, one or more inputs corresponding to the first option and the second option during the ride; and
updating, by the circuitry, the ride fare based on the one or more inputs provided by the passenger and a time duration for which the passenger device is paired with the UAV, wherein the passenger pays the updated ride fare after completion of the ride.

14. The vehicle allocation method of claim 13, further comprising detecting the one or more safety events based on metadata including location data received from the vehicle device of the vehicle, the driver device of a driver of the vehicle, the OBD device of the vehicle, or the passenger device a via the first communication network,
wherein the metadata further includes information corresponding to arguments between the driver and the passenger, anomalies with respect to driving of the vehicle by the driver, vehicle's health, accidents associated with the vehicle, or malicious intent in driver's or passenger's behavior.

15. The vehicle allocation method of claim 14, further comprising detecting the one or more safety events based on UAV data generated by the UAV based on real-time images or videos of the vehicle and surroundings of the vehicle and real-time position information of the vehicle captured by one or more image-capturing sensors and position-tracking sensors of the UAV, respectively.

16. The vehicle allocation method of claim 13, wherein the UAV detaches from the vehicle and moves within a communication range of the vehicle, while maintaining communication with at least one of the vehicle device, the driver device, the OBD device, or the passenger device via a third communication network, to detect the second communication network for establishing communication with the safety server for communicating metadata or the one or more safety events along with UAV data to the safety server.

17. The vehicle allocation method of claim 13, wherein the UAV detaches from the vehicle and moves within a communication range of the vehicle, while maintaining communication with at least one of the vehicle device, the driver device, the OBD device, or the passenger device via a third communication network, to detect one or more vehicle devices or UAVs associated with other vehicles for establishing a chain of communications with the one or more vehicle devices or UAVs for communicating metadata or the one or more safety events along with UAV data to the safety server.

18. The vehicle allocation method of claim 13, wherein the UAV detaches from the vehicle and moves out of a communication range of the vehicle, while communication with the vehicle device, the driver device, the OBD device, and the passenger device via a third communication network, and travels to a safety hotspot center that is nearest to the vehicle based on location coordinates of the safety hotspot center stored in a memory of the UAV, wherein the UAV continues detecting for the second communication network or one or more vehicle devices or UAVs for establishing a chain of communications, for communicating metadata or the one or more safety events along with UAV data to the safety server, while travelling towards the safety hotspot center, and wherein the UAV attaches with the vehicle after communicating the one or more safety events or the metadata along with the UAV data to the safety server or the safety hotspot center.

19. The vehicle allocation method of claim 13, wherein the first option and the second option are presented on the user interface based on a ride distance, a ride type, a time of a day, a vehicle type, or a route type associated with the ride requested by the passenger.

20. The vehicle allocation method of claim 13, wherein the pairing of the passenger device with the UAV is valid during the ride based on the first option and the second option selected by the passenger during the ride, wherein the pairing of the passenger device with the UAV is automatically disconnected when the ride has completed, and wherein the pairing of the driver device of the allocated vehicle with the UAV is valid during a logged-in duration of the driver, wherein the pairing of the driver device with the UAV is automatically disconnected when the driver has logged-out.

\* \* \* \* \*